US012125166B2

(12) United States Patent
Fitzgerald et al.

(10) Patent No.: US 12,125,166 B2
(45) Date of Patent: Oct. 22, 2024

(54) 2D IMAGE SHIFT REGISTRATION THROUGH CORRELATION AND TAILORED ROBUST REGRESSION

(71) Applicant: BAE SYSTEMS Information and Electronic Systems Integration Inc., Nashua, NH (US)

(72) Inventors: Patrick D. Fitzgerald, Mont Vernon, NH (US); Brant M. Kaylor, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 350 days.

(21) Appl. No.: 17/864,136

(22) Filed: Jul. 13, 2022

(65) Prior Publication Data

US 2024/0020789 A1   Jan. 18, 2024

(51) Int. Cl.
*G06T 3/14* (2024.01)
*G06F 17/11* (2006.01)
*G06T 3/4038* (2024.01)

(52) U.S. Cl.
CPC ............ *G06T 3/4038* (2013.01); *G06F 17/11* (2013.01); *G06T 3/14* (2024.01)

(58) Field of Classification Search
CPC .......... G06T 3/4038; G06T 3/14; G06F 17/11
See application file for complete search history.

(56) References Cited

U.S. PATENT DOCUMENTS

| 6,108,458 A | 8/2000 | Hart |
| 6,473,462 B1 | 10/2002 | Chevance |
| 6,990,254 B2 | 1/2006 | Nahum |
| 7,885,480 B2 | 2/2011 | Bryll |
| 7,961,982 B2 | 6/2011 | Sibiryakov |

(Continued)

FOREIGN PATENT DOCUMENTS

| CA | 2850854 A1 * | 6/2013 | ........... G06T 3/0068 |
| WO | WO-2018189039 A1 * | 10/2018 | ........... G06T 3/4038 |

OTHER PUBLICATIONS

Coakley; K.J. "Alignment of Noisy Signals." IEEE Transactions on Instrumentation and Measurement 50.1 (2001): 9 pages.

*Primary Examiner* — Carol Wang
(74) *Attorney, Agent, or Firm* — Maine Cernota & Curran

(57) ABSTRACT

The disclosed method enables efficient registration and correction of random vertical and horizontal offsets of a plurality of images of a feature to enable combination thereof with maximum noise suppression. The method includes obtaining image cross correlations and estimating correlation peaks. If a correlation peak cannot be uniquely determined for a given correlation, all candidates are retained. An improved robust weighted regression is applied thereto to obtain estimates of the image shifts. Dimensional symmetry is exploited to remove redundancy from the weighted normal equation, and computational requirements are further reduced by analytically determining the coefficients matrix and the inhomogeneous matrix, thereby circumventing conventional computations. Solution of the resulting consistent, full rank, linear system requires only matrix inversion. For N images, the present method thereby increases computation speed and reduces storage by approximately $N^2$.

16 Claims, 24 Drawing Sheets

(3 of 24 Drawing Sheet(s) Filed in Color)

(56) References Cited

U.S. PATENT DOCUMENTS

| | | | |
|---|---|---|---|
| 8,155,452 B2 | 4/2012 | Minear | |
| 8,160,364 B2 | 4/2012 | Lam | |
| 8,285,079 B2 | 10/2012 | Robertson | |
| 8,306,274 B2 | 11/2012 | Grycewicz | |
| 8,842,735 B2 | 9/2014 | Robertson | |
| 10,445,616 B2 | 10/2019 | Tom | |
| 10,949,987 B2 | 3/2021 | Liu | |
| 2015/0324966 A1* | 11/2015 | Clifton | G06T 7/337 |
| | | | 382/128 |
| 2016/0188559 A1* | 6/2016 | Maltz | H04N 1/3873 |
| | | | 358/1.15 |

* cited by examiner $A_{int} \equiv$ $k = 1$ to $K+1$ n = 1 to N

| | 1 | 2 | 3 | 4 | 5 | 6 | 7 | $(p_k, q_k)$ |
|---|---|---|---|---|---|---|---|---|
| 1 | 1 | -1 | | | | | | (1, 2) |
| 2 | 1 | | -1 | | | | | (1, 3) |
| 3 | 1 | | | -1 | | | | (1, 4) |
| 4 | 1 | | | | -1 | | | (1, 5) |
| 5 | 1 | | | | | -1 | | (1, 6) |
| 6 | 1 | | | | | | -1 | (1, 7) |
| 7 | | 1 | -1 | | | | | (2, 3) |
| 8 | | 1 | | -1 | | | | (2, 4) |
| 9 | | 1 | | | -1 | | | (2, 5) |
| 10 | | 1 | | | | -1 | | (2, 6) |
| 11 | | 1 | | | | | -1 | (2, 7) |
| 12 | | 1 | | | | | -1 | (2, 7) |
| 13 | | 1 | | | | | -1 | (2, 7) |
| 14 | | | 1 | -1 | | | | (3, 4) |
| 15 | | | 1 | | -1 | | | (3, 5) |
| 16 | | | 1 | | | -1 | | (3, 6) |
| 17 | | | 1 | | | | -1 | (3, 7) |
| 18 | | | | 1 | -1 | | | (4, 5) |
| 19 | | | | 1 | -1 | | | (4, 5) |
| 20 | | | | 1 | | -1 | | (4, 6) |
| 21 | | | | 1 | | | -1 | (4, 7) |
| 22 | | | | | 1 | -1 | | (5, 6) |
| 23 | | | | | 1 | | -1 | (5, 7) |
| 24 | | | | | | 1 | -1 | (6, 7) |
| 25 | 1 | 1 | 1 | 1 | 1 | 1 | 1 | constraint |

Fig. 3B

Fig. 4A (Prior Art)
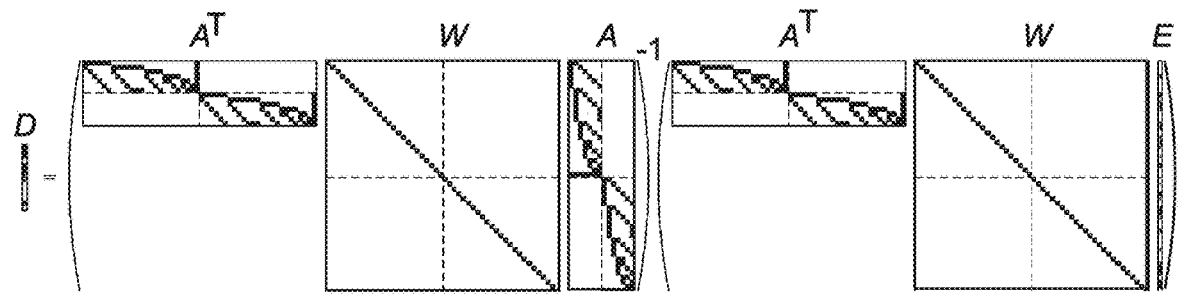
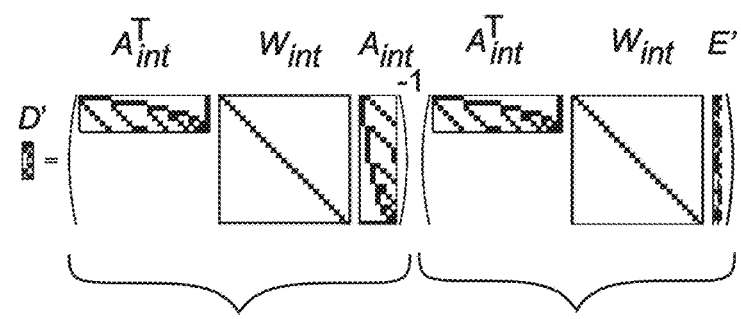
Fig. 4B
Fig. 4C $p,q$ pairs =

| $p_1$ | $p_2$ | $p_3$ | $p_4$ | $p_5$ | $p_6$ | $p_7$ | $p_8$ | $p_9$ | $p_{10}$ | $p_{11}$ | $p_{12}$ |
|---|---|---|---|---|---|---|---|---|---|---|---|
| $q_1$ | $q_2$ | $q_3$ | $q_4$ | $q_5$ | $q_6$ | $q_7$ | $q_8$ | $q_9$ | $q_{10}$ | $q_{11}$ | $q_{12}$ |

=

| 1 | 1 | 1 | 1 | 1 | 2 | 2 | 2 | 2 | 3 | 3 | 4 |
|---|---|---|---|---|---|---|---|---|---|---|---|
| 2 | 3 | 3 | 4 | 5 | 3 | 3 | 4 | 5 | 4 | 5 | 5 | and $E$ =

| $E_{1,1}$ | $E_{2,1}$ | $E_{3,1}$ | $E_{4,1}$ | $E_{5,1}$ | $E_{6,1}$ | $E_{7,1}$ | $E_{8,1}$ | $E_{9,1}$ | $E_{10,1}$ | $E_{11,1}$ | $E_{12,1}$ |
|---|---|---|---|---|---|---|---|---|---|---|---|
| $E_{1,2}$ | $E_{2,2}$ | $E_{3,2}$ | $E_{4,2}$ | $E_{5,2}$ | $E_{6,2}$ | $E_{7,2}$ | $E_{8,2}$ | $E_{9,2}$ | $E_{10,2}$ | $E_{11,2}$ | $E_{12,2}$ |

=

| -16 | 2 | -16 | -7 | -7 | 19 | -1 | 2 | 9 | 6 | 7 | 0 |
|---|---|---|---|---|---|---|---|---|---|---|---|
| 3 | -5 | -10 | -2 | -14 | -10 | -11 | 0 | -15 | 10 | -4 | -11 | and $w$ =

| $w_1$ | $w_2$ | $w_3$ | $w_4$ | $w_5$ | $w_6$ | $w_7$ | $w_8$ | $w_9$ | $w_{10}$ | $w_{11}$ | $w_{12}$ |
|---|---|---|---|---|---|---|---|---|---|---|---|

=

| 0.83 | 0.10 | 0.18 | 0.78 | 0.74 | 0.08 | 0.19 | 0.25 | 0.96 | 0.37 | 0.47 | 0.72 |
|---|---|---|---|---|---|---|---|---|---|---|---|

Fig. 5A $H =$

| 0 | $w_1$ | $w_2+w_3$ | $w_4$ | $w_5$ |
|---|---|---|---|---|
| 0 | 0 | $w_6+w_7$ | $w_8$ | $w_9$ |
| 0 | 0 | 0 | $w_{10}$ | $w_{11}$ |
| 0 | 0 | 0 | 0 | $w_{12}$ |
| 0 | 0 | 0 | 0 | 0 |

$=$

| 0 | 0.83 | 0.10+0.18 | 0.78 | 0.74 |
|---|---|---|---|---|
| 0 | 0 | 0.08+0.19 | 0.25 | 0.96 |
| 0 | 0 | 0 | 0.37 | 0.47 |
| 0 | 0 | 0 | 0 | 0.72 |
| 0 | 0 | 0 | 0 | 0 |

$=$

| 0 | 0.83 | 0.28 | 0.78 | 0.74 |
|---|---|---|---|---|
| 0 | 0 | 0.27 | 0.25 | 0.96 |
| 0 | 0 | 0 | 0.37 | 0.47 |
| 0 | 0 | 0 | 0 | 0.72 |
| 0 | 0 | 0 | 0 | 0 |

Fig. 5B $$G = H + H^T =$$

| 0 | 0.83 | 0.28 | 0.78 | 0.74 |
|---|---|---|---|---|
| 0 | 0 | 0.27 | 0.25 | 0.96 |
| 0 | 0 | 0 | 0.37 | 0.47 |
| 0 | 0 | 0 | 0 | 0.72 |
| 0 | 0 | 0 | 0 | 0 |

\+

| 0 | 0 | 0 | 0 | 0 |
|---|---|---|---|---|
| 0.83 | 0 | 0 | 0 | 0 |
| 0.28 | 0.27 | 0 | 0 | 0 |
| 0.78 | 0.25 | 0.37 | 0 | 0 |
| 0.74 | 0.96 | 0.47 | 0.72 | 0 |

=

| 0 | 0.83 | 0.28 | 0.78 | 0.74 |
|---|---|---|---|---|
| 0.83 | 0 | 0.27 | 0.25 | 0.96 |
| 0.28 | 0.27 | 0 | 0.37 | 0.47 |
| 0.78 | 0.25 | 0.37 | 0 | 0.72 |
| 0.74 | 0.96 | 0.47 | 0.72 | 0 |

Fig. 5C

Fig. 5D $$G_{diag} = \begin{bmatrix} 0 & 0 & 0 & 0 & 2.9 \\ 0 & 0 & 0 & 2.1 & 0 \\ 0 & 0 & 1.4 & 0 & 0 \\ 0 & 2.3 & 0 & 0 & 0 \\ 2.6 & 0 & 0 & 0 & 0 \end{bmatrix}$$

Fig. 5E $$L = w_{constraint}1_{N \times N} + G_{diag} - G$$

$$= 1.0 \cdot \begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix} + \begin{bmatrix} 2.6 & 0 & 0 & 0 & 0 \\ 0 & 2.3 & 0 & 0 & 0 \\ 0 & 0 & 1.4 & 0 & 0 \\ 0 & 0 & 0 & 2.1 & 0 \\ 0 & 0 & 0 & 0 & 2.9 \end{bmatrix}$$

$$- \begin{bmatrix} 0 & 0.83 & 0.28 & 0.78 & 0.74 \\ 0.83 & 0 & 0.27 & 0.25 & 0.96 \\ 0.28 & 0.27 & 0 & 0.37 & 0.47 \\ 0.78 & 0.25 & 0.37 & 0 & 0.72 \\ 0.74 & 0.96 & 0.47 & 0.72 & 0 \end{bmatrix} = \begin{bmatrix} 3.6 & 0.17 & 0.72 & 0.22 & 0.26 \\ 0.17 & 3.3 & 0.73 & 0.75 & 0.037 \\ 0.72 & 0.73 & 2.4 & 0.63 & 0.53 \\ 0.22 & 0.75 & 0.63 & 3.1 & 0.28 \\ 0.26 & 0.037 & 0.53 & 0.28 & 3.9 \end{bmatrix}$$

Fig. 5F $$V_{horz} =$$

| 0 | $w_1 \cdot E_{1,1}$ | $w_2 \cdot E_{2,1}$ + $w_3 \cdot E_{3,1}$ | $w_4 \cdot E_{4,1}$ | $w_5 \cdot E_{5,1}$ |
|---|---|---|---|---|
| 0 | 0 | $w_6 \cdot E_{6,1}$ + $w_7 \cdot E_{7,1}$ | $w_8 \cdot E_{8,1}$ | $w_9 \cdot E_{9,1}$ |
| 0 | 0 | 0 | $w_{10} \cdot E_{10,1}$ | $w_{11} \cdot E_{11,1}$ |
| 0 | 0 | 0 | 0 | $w_{12} \cdot E_{12,1}$ |
| 0 | 0 | 0 | 0 | 0 |

=

| 0 | 0.83 × -16 | 0.10 × 2 + 0.18 × -16 | 0.78 × -7 | 0.74 × -7 |
|---|---|---|---|---|
| 0 | 0 | 0.08 × 19 + 0.19 × -1 | 0.25 × 2 | 0.96 × 9 |
| 0 | 0 | 0 | 0.37 × 6 | 0.47 × 7 |
| 0 | 0 | 0 | 0 | 0.72 × 0 |
| 0 | 0 | 0 | 0 | 0 |

=

| 0 | -13 | -2.7 | -5.5 | -5.2 |
|---|---|---|---|---|
| 0 | 0 | 1.2 | 0.5 | 8.7 |
| 0 | 0 | 0 | 2.2 | 3.3 |
| 0 | 0 | 0 | 0 | 0 |
| 0 | 0 | 0 | 0 | 0 |

Fig. 5G $$V_{vert} =$$

| 0 | $w_1 \cdot E_{1,2}$ | $w_2 \cdot E_{2,2}$ + $w_3 \cdot E_{3,2}$ | $w_4 \cdot E_{4,2}$ | $w_5 \cdot E_{5,2}$ |
|---|---|---|---|---|
| 0 | 0 | $w_6 \cdot E_{6,2}$ + $w_7 \cdot E_{7,2}$ | $w_8 \cdot E_{8,2}$ | $w_9 \cdot E_{9,2}$ |
| 0 | 0 | 0 | $w_{10} \cdot E_{10,2}$ | $w_{11} \cdot E_{11,2}$ |
| 0 | 0 | 0 | 0 | $w_{12} \cdot E_{12,2}$ |
| 0 | 0 | 0 | 0 | 0 |

=

| 0 | 0.83×3 | 0.10×-5 + 0.18×-10 | 0.78×-2 | 0.74×-14 |
|---|---|---|---|---|
| 0 | 0 | 0.08×-10 + 0.19×-11 | 0.25×0 | 0.96×-15 |
| 0 | 0 | 0 | 0.37×10 | 0.47×-4 |
| 0 | 0 | 0 | 0 | 0.72×-11 |
| 0 | 0 | 0 | 0 | 0 |

≈

| 0 | 2.5 | -2.3 | -1.6 | -10 |
|---|---|---|---|---|
| 0 | 0 | -2.9 | 0 | -14 |
| 0 | 0 | 0 | 3.7 | -1.9 |
| 0 | 0 | 0 | 0 | -7.9 |
| 0 | 0 | 0 | 0 | 0 |

Fig. 5H $$Z_{horz} = V_{horz} - V^T_{horz}$$

|   |     |      |      |      |
|---|-----|------|------|------|
| 0 | -13 | -2.7 | -5.5 | -5.2 |
| 0 | 0   | 1.2  | 0.5  | 8.7  |
| 0 | 0   | 0    | 2.2  | 3.3  |
| 0 | 0   | 0    | 0    | 0    |
| 0 | 0   | 0    | 0    | 0    |

−

|      |     |     |     |   |
|------|-----|-----|-----|---|
| 0    | 0   | 0   | 0   | 0 |
| -13  | 0   | 0   | 0   | 0 |
| -2.7 | 1.2 | 0   | 0   | 0 |
| -5.5 | 0.5 | 2.2 | 0   | 0 |
| -5.2 | 8.7 | 3.3 | 0   | 0 |

=

|     |      |      |      |      |
|-----|------|------|------|------|
| 0   | -13  | -2.7 | -5.5 | -5.2 |
| 13  | 0    | 1.2  | 0.5  | 8.7  |
| 2.7 | -1.2 | 0    | 2.2  | 3.3  |
| 5.5 | -0.5 | -2.2 | 0    | 0    |
| 5.2 | -8.7 | -3.3 | 0    | 0    |

Fig. 5I $$Z_{vert} = V_{vert} - V_{vert}^T$$

|   |     |      |      |     |
|---|-----|------|------|-----|
| 0 | 2.5 | -2.3 | -1.6 | -10 |
| 0 | 0   | -2.9 | 0    | -14 |
| 0 | 0   | 0    | 3.7  | -1.9|
| 0 | 0   | 0    | 0    | -7.9|
| 0 | 0   | 0    | 0    | 0   |

$-$

|      |      |     |     |   |
|------|------|-----|-----|---|
| 0    | 0    | 0   | 0   | 0 |
| 2.5  | 0    | 0   | 0   | 0 |
| -2.3 | -2.9 | 0   | 0   | 0 |
| -1.6 | 0    | 3.7 | 0   | 0 |
| -10  | -14  | -1.9| -7.9| 0 |

$=$

|      |     |      |      |      |
|------|-----|------|------|------|
| 0    | 2.5 | -2.3 | -1.6 | -10  |
| -2.5 | 0   | -2.9 | 0    | -14  |
| 2.3  | 2.9 | 0    | 3.7  | -1.9 |
| 1.6  | 0   | -3.7 | 0    | -7.9 |
| 10   | 14  | 1.9  | 7.9  | 0    |

Fig. 5J

| $R_{1,1}$ = | $(z_{horz})_{1,1}$ + | $(z_{horz})_{1,2}$ + | $(z_{horz})_{1,3}$ + | $(z_{horz})_{1,4}$ + | $(z_{horz})_{1,5}$ = | 0 | + | -1.3 | + | -2.7 | + | -5.5 | + | -5.2 | = | -2.7 |
| $R_{2,1}$ = | $(z_{horz})_{2,1}$ + | $(z_{horz})_{2,2}$ + | $(z_{horz})_{2,3}$ + | $(z_{horz})_{2,4}$ + | $(z_{horz})_{2,5}$ = | 13 | + | 0 | + | 1.2 | + | 0.5 | + | 8.7 | = | 24 |
| $R_{3,1}$ = | $(z_{horz})_{3,1}$ + | $(z_{horz})_{3,2}$ + | $(z_{horz})_{3,3}$ + | $(z_{horz})_{3,4}$ + | $(z_{horz})_{3,5}$ = | 2.7 | + | -1.2 | + | 0 | + | 2.2 | + | 3.3 | = | 7 |
| $R_{4,1}$ = | $(z_{horz})_{4,1}$ + | $(z_{horz})_{4,2}$ + | $(z_{horz})_{4,3}$ + | $(z_{horz})_{4,4}$ + | $(z_{horz})_{4,5}$ = | 5.5 | + | -0.5 | + | -2.2 | + | 0 | + | 0 | = | 2.7 |
| $R_{5,1}$ = | $(z_{horz})_{5,1}$ + | $(z_{horz})_{5,2}$ + | $(z_{horz})_{5,3}$ + | $(z_{horz})_{5,4}$ + | $(z_{horz})_{5,5}$ = | 5.2 | + | -8.7 | + | -3.3 | + | 0 | + | 0 | = | -6.8 |

Fig. 5K

| $R_{1,2} =$ | $R_{2,2} =$ | $R_{3,2} =$ | $R_{4,2} =$ | $R_{5,2} =$ |
|---|---|---|---|---|
| $(Z_{vert})_{1,1}$ | $(Z_{vert})_{2,1}$ | $(Z_{vert})_{3,1}$ | $(Z_{vert})_{4,1}$ | $(Z_{vert})_{5,1}$ |
| + | + | + | + | + |
| $(Z_{vert})_{1,2}$ | $(Z_{vert})_{2,2}$ | $(Z_{vert})_{3,2}$ | $(Z_{vert})_{4,2}$ | $(Z_{vert})_{5,2}$ |
| + | + | + | + | + |
| $(Z_{vert})_{1,3}$ | $(Z_{vert})_{2,3}$ | $(Z_{vert})_{3,3}$ | $(Z_{vert})_{4,3}$ | $(Z_{vert})_{5,3}$ |
| + | + | + | + | + |
| $(Z_{vert})_{1,4}$ | $(Z_{vert})_{2,4}$ | $(Z_{vert})_{3,4}$ | $(Z_{vert})_{4,4}$ | $(Z_{vert})_{5,4}$ |
| + | + | + | + | + |
| $(Z_{vert})_{1,5}$ | $(Z_{vert})_{2,5}$ | $(Z_{vert})_{3,5}$ | $(Z_{vert})_{4,5}$ | $(Z_{vert})_{5,5}$ |
| = | = | = | = | = |
| 0 | -2.5 | 2.3 | 1.6 | 10 |
| + | + | + | + | + |
| 2.5 | 0 | 2.9 | 0 | 14 |
| + | + | + | + | + |
| -2.3 | -2.9 | 0 | -3.7 | 1.9 |
| + | + | + | + | + |
| -1.6 | 0 | 3.7 | 0 | 7.9 |
| + | + | + | + | + |
| -10 | -14 | -1.9 | -7.9 | 0 |
| = | = | = | = | = |
| -12 | -20 | 7 | -10 | 35 |

Fig. 5L $$R = \begin{array}{|c|c|} \hline -27 & -12 \\ \hline 24 & -20 \\ \hline 7 & 7 \\ \hline 2.7 & -10 \\ \hline -6.8 & 35 \\ \hline \end{array}$$

Fig. 5M $$D' = L^{-1}R$$

$$= \begin{pmatrix} 3.6 & 0.17 & 0.72 & 0.22 & 0.26 \\ 0.17 & 3.3 & 0.73 & 0.75 & 0.037 \\ 0.72 & 0.73 & 2.4 & 0.63 & 0.53 \\ 0.22 & 0.75 & 0.63 & 3.1 & 0.28 \\ 0.26 & 0.037 & 0.53 & 0.28 & 3.9 \end{pmatrix}^{-1} \times \begin{pmatrix} -27 & -12 \\ 24 & -20 \\ 7 & 7 \\ 2.7 & -10 \\ -6.8 & 35 \end{pmatrix}$$

$$= \begin{pmatrix} 0.29 & 0.0049 & -0.087 & -0.0033 & -0.0075 \\ 0.0049 & 0.34 & -0.09 & -0.064 & 0.013 \\ -0.087 & -0.09 & 0.5 & -0.068 & -0.056 \\ -0.0033 & -0.064 & -0.068 & 0.35 & -0.015 \\ -0.0075 & 0.013 & -0.056 & -0.015 & 0.27 \end{pmatrix} \times \begin{pmatrix} -27 & -12 \\ 24 & -20 \\ 7 & 7 \\ 2.7 & -10 \\ -6.8 & 35 \end{pmatrix} = \begin{pmatrix} -8.3 & -4.4 \\ 6.9 & -6.2 \\ 3.9 & 5.1 \\ -0.83 & -3.2 \\ -1.7 & 8.8 \end{pmatrix}$$

Fig. 5N

2D IMAGE SHIFT REGISTRATION THROUGH CORRELATION AND TAILORED ROBUST REGRESSION

FIELD

The disclosure relates to image reconstruction, and, more particularly, to registration to support the superposition of a plurality of mutually offset images of a scene.

BACKGROUND

When attempting to image a scene for which single images have a low signal-to-noise ratio (SNR), it can be necessary to collect and superimpose multiple images so as to produce a composite image having an increased SNR. However, in some imaging scenarios the physical subject being imaged may not be static, and/or the means of imaging the subject may not be static, thereby causing misalignment of the superimposed images, and degrading the quality of the composite image.

An example would be attempting to image a very small, dim feature using a microscope, where the feature may be subject to Brownian motion and/or the microscope stage may be unavoidably affected by vibrations. Even if the feature movements are small in absolute terms, the microscope may magnify these movements such that the feature will appear to move sporadically within the field of view, causing a composite image of the feature to appear blurry, and degrading the efficacy of the microscope as a tool to image the feature. Similar examples arise, for example, in the fields of astronomy and navigation.

This problem is illustrated by FIGS. 1A and 1B. FIG. 1A is a single image of a feature obtained without significant noise. FIG. 1B is a superposition of five such images of the same feature, where each of the images has captured the feature at a different, random location. The result is an apparent image of five copies of the feature.

When this problem arises, it is desirable to make an attempt to "register" the individual images, before they are combined into the composite image, by estimating the X and Y locations of the feature or features within each of the images. These location estimates then inform how to correctively shift each image, so that the final locations of the features are in near alignment, and signal from the features directly overlaps when the images are superimposed to form the composite image. Each of these X and Y locations can be interpreted as a combination of an average X and Y location that is common to all of the images plus some absolute shift which changes between the images. The registration process then entails estimating the absolute shifts, so that reverse shifts can be applied to the images, so that all of the features in all of the images are located at their average locations.

The general problem can be defined as follows:
the true signal structure is unknown, but is consistent and reasonably compact;
each of the N sampled images, $M_n$, has an independent absolute shift $\vec{\delta}_n = (\delta_n^{horz}, \delta_n^{vert})$, representing the horizontal and vertical shift of each image;
the absolute shifts are nonparametric, in that there is no pattern underlying the shifts, i.e. knowing one of the shifts places no constraints on any of the other shifts; and
the image size is large enough to prevent the imaged feature from being shifted outside of the field of view of the images.

The ultimate goal is to estimate the absolute shifts of the individual noisy images, so that they can be "registered" and superimposed to form a high-quality composite image. In many cases, it is not necessary to estimate the absolute shifts of the images, because only the relative translations of the images are needed to form a high-quality composite image. The image alignment process will be deemed successful when the images are translated so that all of the features in the images are in the same final location. If the absolute signal placement matters for a specific application, a final shift may be estimated from the superimposed, composite image, which will have much higher SNR as compared to the individual images.

This is illustrated in FIGS. 1C-1D. FIG. 1C represents a single image, similar to FIG. 1A, but realistically measured in the presence of significant noise, while FIG. 1D illustrates the result of summing 50 such images after estimating and correcting for their absolute shifts.

Of course, it is often desirable for these absolute shift estimations to be made rapidly, and without requiring an excess of computing resources.

What is needed, therefore, is a method and apparatus for accurately and efficiently estimating the positional shifts between a plurality of images of a feature, including images where the precise nature of the feature or features is not known a priori.

SUMMARY

The present disclosure is a method and apparatus for accurately and efficiently estimating the positional shifts between a plurality of images of a feature, including images where the precise nature of the feature or features is not known a priori.

The disclosed method addresses this problem by using image cross correlations to estimate all of the relative shifts, $(\vec{\delta}_p - \vec{\delta}_q)$, and extracts estimates of the absolute shifts, $\vec{\delta}_n$, by relating the relative estimates and absolute shifts in a linear system of equations and solving the system through a tailored robust regression technique. The regression is significantly expedited by tailoring the core matrix arithmetic to take maximum advantage of the sparsity and symmetry of the linear system of equations.

In some cases, applying pre-processing to the image input data can improve the performance of shift-estimating calculations, for example by improving the validity of the assumptions used in the calculations or tempering the impact of the noise. The choice of what pre-processing should be applied is highly context specific, and depends critically on the nature of the noise and of the signal. Some examples of pre-processing include various forms of smoothing, background subtraction, application of filters, regularization, spatial transformations, up-sampling/down-sampling, and cropping.

Once any pre-processing has been applied, the next step is to estimate the relative shifts between each pair of images $M_p$ and $M_q$, $\vec{\delta}_{pq} = (\vec{\delta}_p - \vec{\delta}_q)$, by computing 2D cross-correlations between all possible combinations of the measured images, and then "peak-picking" the locations of the correlation peaks, which correspond to estimates of the relative shifts. It is not necessary to calculate autocorrelations (p=q) nor reflected cross-correlations ($\vec{d}_{qp}$).

The method that is used for the peak-picking (aka peak-finding) will be application specific. Some examples include finding the maximum intensity cross correlation pixel or finding the centroid of a region of generally high intensity. The peak-finding may benefit from applying pre-processing to the cross-correlations, such as masking, smoothing, and other filtering. Depending on the selected technique, the peak-finding process may yield more than one peak estimate for some of the cross-correlations. In embodiments, all of the estimates are retained, which can lead to improved results.

The process of calculating these cross correlations and peak finding results in distinct estimates of the relative shifts $\vec{d}_{pq}=(\vec{\delta}_p-\vec{\delta}_q)$. The next step is to use the relative shift estimates to determine estimates for the absolute shifts $\vec{\delta}_n$. Each $\vec{d}_{pq}$ estimate can be considered to be a measurement of a linear combination of the full list of (unknown) $\vec{\delta}_n$ values. The underlying $\vec{\delta}_n$ values are determined by solving the corresponding system of linear equations by applying a regression algorithm.

Most regression algorithms are designed for application to a 1D list of independent variables. When these algorithms are applied to a 2D system, the 2D system is typically represented as the concatenation of the 1D horizontal component sub-system and the 1D vertical component subsystem. The resulting linear system can be expressed as AD=E. Due to the nature and quantity of relative shift estimates, the present system of linear equations is overdetermined, in that there is no solution for D which satisfies all of the equations, and equivalently the naïve matrix solution $D=A^{-1}E$ is wholly invalid.

To counter this common circumstance, a standard approach is to search instead for a "least squares" solution, i.e. determine the D that minimizes the sum of the squares of the fit residuals: $\Sigma_i((AD)_i-E_i)^2$. In standard practice, this is solved through the corresponding "normal equation," $A^TAD=A^TE$. The solution $D=(A^TA)^{-1}(A^TE)$ is mathematically equivalent to finding the least squares solution. The main benefit of the normal equation is that $A^TA$ is not overdetermined, and has full rank so long as A has full rank, thus guaranteeing the existence of a unique solution. Moreover, the normal equation returns the problem to a matrix arithmetic problem for which solutions are readily calculated.

Outliers in the relative shift estimates forming E present a challenge for a least squares solution, because entries of E which are inconsistent with the majority of the estimates will have a much larger contribution to the sum $\Sigma_i((AD)_i-E_i)^2$. Regression techniques which are specifically-designed to handle these outliers are referred to as "robust". A technique that is applied by many such robust regression implementations is to generate a weighted least squares solution instead of an ordinary least squares solution. Given a list of nonnegative weights $w_i$ corresponding to entries in E, the weighted least squares solution minimizes $\tau_i w_i \cdot ((AD)_i-E_i)^2$, wherein the square of the residuals has a "weighted" contribution to the sum. The corresponding weighted normal equation is $A^TWAD=A^TWE$, whose solution is similarly $D=(A^TWA)^{-1}(A^TWE)$, where W is the square matrix having the weights $w_i$ inserted along its diagonal, with all other matrix values being zero.

According to the present disclosure, the execution speed and estimation quality of the robust regression is implicitly improved by tailoring the robust regression implementation in the following ways:

Exploiting the horizontal/vertical component symmetry in the linear system to remove redundancy from the problem solving;

Analytically calculating portions of the weighed normal equation, to significantly reduce code memory demands and circumvent major run-time computation steps; and Modifying how residuals and weights are calculated to accommodate the tailored linear system representation and to better embody the properties of the relative shift estimation scheme.

In summary, embodiments of the method of the present disclosure include the following steps:

Pre-processing the images to reduce the impact of noise and clutter.

Evaluating all non-redundant, nontrivial cross correlations of the pre-processed images. In each cross correlation, estimate the peak(s) which represents estimates of the relative shifts of the images.

Employing a robust regression algorithm to determine the absolute shifts.

Tailoring the matrix operations, application of weights, and analysis of residuals.

Advantages of these steps, in embodiments, are as follows:

Pre-processing the images can significantly improve the accuracy of the peak-fitting.

Cross-correlating the images transforms the ambiguous problem of estimating absolute shifts of an unknown signal structure to searching for peaks in cross correlation images.

The cross correlations also convert the problem of estimating N absolute shifts into estimating $$\frac{N(N-1)}{2}$$

relative shifts, which means that each estimate need not be perfect.

The robust regression algorithm handles the conversion from many relative shift estimates to few absolute shift estimates, while being minimally affected by occasional, wildly erroneous relative estimates.

Taking advantage of the symmetries that are intrinsic to the problem of image registration simplifies the weighted normal equation calculations and thereby significantly reduces the storage space and execution time demands present in the robust regression algorithm.

The remaining tailoring steps make the robust regression algorithm compatible with the modified normal equation implementation, and make the solution more meaningful through the coordinated assignment of weights and analysis of residuals.

A first general aspect of the present disclosure is a method of combining a plurality of images of a scene having random mutual offsets to form a composite image having increased signal-to-noise. The method includes obtaining a plurality of images of a scene, the images having unknown, random vertical and horizontal offsets relative to a center of the images, each of the images being a combination of signal and noise, the center of the images being defined such that averages of both the horizontal offsets and the vertical offsets are zero, forming a plurality of cross-correlations of the images, where each of the images is cross-correlated with each of the other images, while all auto-correlations and reflections are omitted, each of the cross-correlations being a cross-correlation of an associated pair of the images, for each of the cross-correlations, picking at least one peak as an estimate of a relative offset between its associated images, each of said relative offsets comprising a relative horizontal offset component and a relative vertical offset component, assigning a weight to each of the picked peaks.

The method further includes calculating a matrix H having rows and columns corresponding to the images, wherein for each of the cross-correlations, a value of H at a row and column corresponding to the pair of images associated with the cross-correlation is equal to a sum of all weights assigned to peaks picked in the cross-correlation, and wherein all other values within H are zero, calculating a matrix G that is equal to a sum of H and its transpose $H^T$.

The method further includes calculating a matrix G' wherein each diagonal value of G' is equal to a sum of the values of the corresponding row of G, and all other values of G' are zero, forming a matrix Q filled with ones having a dimensionality equal to a dimensionality of G, calculating a matrix L that is equal to Q+G'−G.

The method further includes forming a 2-column matrix E', wherein the rows of E' correspond with the peaks that were picked for the cross-correlations, and wherein a first of the columns of E' comprises the relative horizontal offset components of the picked peaks, and a second of the columns of E' comprises the relative vertical offset components of the picked peaks.

The method further includes calculating a matrix $V^{horz}$ having rows and columns corresponding to the images, wherein for each of the cross-correlations, a value of $V^{horz}$ at a row and column corresponding to the pair of images associated with the cross-correlation is equal to a sum of all of the weights of the peaks that were picked for the cross-correlation multiplied by the value of the first column of E' in the row that corresponds to the picked peak.

The method further includes calculating a matrix $V^{vert}$ having rows and columns corresponding to the images, wherein for each of the cross-correlations, a value of $V^{vert}$ at a row and column corresponding to the pair of images associated with the cross-correlation is equal to a sum of all of the weights of the peaks that were picked for the cross-correlation multiplied by the value of the second column of E' in the row that corresponds to the picked peak, calculating matrices $Z^{horz}=V^{horz}-(V^{horz})^T$ and $Z^{vert}=V^{vert}-(V^{vert})^T$.

The method further includes calculating a 2-column matrix R, wherein the rows of R correspond with the images of the scene, wherein each of the values of R in a first of the columns of R is equal to a sum of all of the values of $Z^{horz}$ in the corresponding row thereof, and each of the values of R in a second of the columns of R is equal to a sum of all of the values of $Z^{vert}$ in the corresponding row thereof.

The method further includes solving for a 2-column matrix $D'=L^{-1}R$, where the values in a first of the columns of D' are estimates of the horizontal offsets of the images relative to the center of the images, and the values in a second of the columns of D' are estimates of the vertical offsets of the images relative to the center of the images.

Finally the method includes shifting each of the images horizontally and vertically according respectively to the first and second columns of D', and adding the shifted images together to form the composite image.

Embodiments further include applying pre-processing to the images before forming the plurality of cross-correlations. In some of these embodiments, the pre-processing includes at least one of smoothing, background subtraction, filtering, regularization, special transformation, up-sampling, down-sampling, and cropping.

In any of the above embodiments, picking at least one peak for at least one of the cross-correlations can include finding a maximum intensity pixel of the cross-correlation.

In any of the above embodiments, picking at least one peak for at least one of the cross-correlations can include finding a centroid of a region of relatively high intensity in the cross-correlation.

In any of the above embodiments, the weights can be determined according to a degree of confidence that the corresponding peak is an outlier.

In any of the above embodiments, the values of the weights can be iteratively updated until a corresponding fit stabilizes.

In any of the above embodiments, for each of the peaks, the weight that is applied to the peak can be determined by unsupervised anomaly detection according to a degree of confidence that the peak is an outlier.

A second general aspect of the present disclosure is a method of combining a plurality of images of a scene having random mutual offsets to form a composite image having increased signal-to-noise. The method includes obtaining a plurality of N images of a scene, the images having unknown, random vertical $\delta_n^{vert}$ and horizontal $\delta_n^{horz}$ offsets relative to a center of the images, where n=1 to N, each of said offsets being expressed as a vector $\vec{\delta}_n=(\delta_n^{horz}, \delta_n^{vert})$, each of the images being a combination of signal and noise.

The method further includes forming a plurality of cross-correlations $X_{p,q}$ of the images, where each of the images is cross-correlated with each of the other images, while all auto-correlations $X_{p,p}$ and reflections $X_{q,p}$ are omitted, resulting in $$\frac{N(N-1)}{2}$$

cross-correlations $X_{p,q}$, for each of the cross-correlations $X_{p,q}$.

The method further includes picking at least one peak as an estimate $\vec{d}_k$ of a relative offset $\vec{d}_{p,q}=\vec{\delta}_p-\vec{\delta}_q=(\delta_p^{horz}-\delta_q^{horz}, \delta_p^{vert}-\delta_q^{vert})$ between image p and image q, where the total number K of estimates $\vec{d}_k$, is equal to or greater than $$\frac{N(N-1)}{2},$$

and wherein at least one peak is picked for each of the cross-correlations $X_{p,q}$.

The method further includes forming a K×2 matrix E', wherein for k=1 to K, $E'_{k,1}=d_k^{horz}$ and $E'_{k,2}=d_k^{vert}$, solving for an N×2 matrix D', where for each n=1 to N, $D'_{n,1}$ is an estimate of $\delta_n^{horz}$ and $D'_{n,2}$ is an estimate of $\delta_n^{vert}$, by selecting the center of the images such that $\Sigma_{n=1}^{N} D'_{n,1}=0$ and $\Sigma_{n=1}^{N} D'_{n,2}=0$, and applying a weighted regression to an equation $D'=(A_{int}^{T} W_{int} A_{int})^{-1}(A_{int}^{T} W_{int} E')$.

Applying said weighted regression includes solving an equation $A_{int}^{T} W_{int} A_{int} = L$ according to the following steps:
  calculating an N×N matrix H, wherein for each of the cross-correlations $X_{p,q}$, $H_{p,q}$ is equal to a sum of all weights $w_k$ for which $p_k = p$ and $q_k = q$, and wherein all other values within H are zero;
  calculating an N×N matrix $G = H + H^T$; and
  calculating the N×N matrix L according to $L = w_k 1_{N \times N} + \text{diag}(\Sigma_{i=1}^{N}(G)_{i,j}) - G$, wherein:
    $1_{N \times N}$ is an N×N matrix filled with ones;
    $\Sigma_{i=1}^{N}(G)_{i,j}$ sums over all rows i of G, resulting in a column vector $G_j$; and
    $\text{diag}(\Sigma_{i=1}^{N}(G)_{i,j})$ generates a square matrix having the jth diagonal entry=$G_j$, and all off-diagonal values=0.

The method further includes solving an equation $A_{int}^{T} W_{int} E' = R$ according to the following steps:
  calculating an N×N matrix $V^{horz}$, wherein for each of the cross-correlations $X_{p,q}$, $V_{p,q}^{horz}$ is equal a sum of $w_k(E')_{k,1}$ over all k for which $p_k = p$ and $q_k = q$;
  calculating an N×N matrix $V^{vert}$, wherein for each of the cross-correlations $X_{p,q}$, $V_{p,q}^{vert}$ is equal a sum of $w_k(E')_{k,2}$ over all k for which $p_k = p$ and $q_k = q$;
  calculating N×N matrices $Z^{horz} = V^{horz} - (V^{horz})^T$ and $Z^{vert} = V^{vert} - (V^{vert})^T$;
  calculating the N×2 matrix R, wherein $R_{i,1} = \Sigma_{j=1}^{N} Z_{ij}^{horz}$ and $R_{i,2} = \Sigma_{j=1}^{N} Z_{ij}^{vert}$; and
  calculating $D' = L^{-1} R$.

Finally, the method includes shifting each of the images n=1 to N horizontally and vertically according respectively to $D'_{n,1}$ and $D'_{n,2}$, and adding the shifted images together to form the composite image.

Embodiments further include applying pre-processing to the images before forming the plurality of cross-correlations. In some of these embodiments, the pre-processing includes at least one of smoothing, background subtraction, filtering, regularization, special transformation, up-sampling, down-sampling, and cropping.

In any of the above embodiments, picking at least one peak for at least one of the cross-correlations $X_{p,q}$ can include finding a maximum intensity pixel of $X_{p,q}$.

In any of the above embodiments, picking at least one peak for at least one of the cross-correlations $X_{p,q}$ can include finding a centroid of a region of relatively high intensity in $X_{p,q}$.

In any of the above embodiments, applying the weighted regression can include applying an iterative re-weighted least squares regression wherein the values of $w_k$ are iteratively updated until a corresponding fit stabilizes.

In any of the above embodiments, applying the weighted regression can include determining the weights by unsupervised anomaly detection, wherein for each value of k=1 to K, the value of $w_k$ is determined according to a degree of confidence that $\vec{d}_k$ is an outlier.

A third general aspect of the present disclosure is non-transitory computer readable storage medium having instructions stored thereon that, when executed by a computing device, combine a plurality of images of a scene according to a process. The process includes obtaining a plurality of images of a scene, the images having unknown, random vertical and horizontal offsets relative to a center of the images, each of the images being a combination of signal and noise, the center of the images being defined such that averages of both the horizontal offsets and the vertical offsets are zero, forming a plurality of cross-correlations of the images, where each of the images is cross-correlated with each of the other images, while all auto-correlations and reflections are omitted, each of the cross-correlations being a cross-correlation of an associated pair of the images, for each of the cross-correlations, picking at least one peak as an estimate of a relative offset between its associated images, each of said relative offsets comprising a relative horizontal offset component and a relative vertical offset component, assigning a weight to each of the picked peaks.

The process further includes calculating a matrix H having rows and columns corresponding to the images, wherein for each of the cross-correlations, a value of H at a row and column corresponding to the pair of images associated with the cross-correlation is equal to a sum of all weights assigned to peaks picked in the cross-correlation, and wherein all other values within H are zero.

The process further includes calculating a matrix G that is equal to a sum of H and its transpose $H^T$ and calculating a matrix G' wherein each diagonal value of G' is equal to a sum of the values of the corresponding row of G, and all other values of G' are zero.

The process further includes forming a matrix Q filled with ones having a dimensionality equal to a dimensionality of G, calculating a matrix L that is equal to Q+G'−G, and forming a 2-column matrix E', wherein the rows of E' correspond with the peaks that were picked for the cross-correlations, and wherein a first of the columns of E' comprises the relative horizontal offset components of the picked peaks, and a second of the columns of E' comprises the relative vertical offset components of the picked peaks.

The process further includes calculating a matrix $V^{horz}$ having rows and columns corresponding to the images, wherein for each of the cross-correlations, a value of $V^{horz}$ at a row and column corresponding to the pair of images associated with the cross-correlation is equal to a sum of all of the weights of the peaks that were picked for the cross-correlation multiplied by the value of the first column of E' in the row that corresponds to the picked peak.

The process further includes calculating a matrix $V^{vert}$ having rows and columns corresponding to the images, wherein for each of the cross-correlations, a value of $V^{vert}$ at a row and column corresponding to the pair of images associated with the cross-correlation is equal to a sum of all of the weights of the peaks that were picked for the cross-correlation multiplied by the value of the second column of E' in the row that corresponds to the picked peak.

The process further includes calculating matrices $Z^{horz} = V^{horz} - (V^{horz})^T$ and $Z^{vert} = V^{vert} - (V^{vert})^T$, and calculating a 2-column matrix R, wherein the rows of R correspond with the images of the scene, wherein each of the values of R in a first of the columns of R is equal to a sum of all of the values of $Z^{horz}$ in the corresponding row thereof, and each of the values of R in a second of the columns of R is equal to a sum of all of the values of $Z^{vert}$ in the corresponding row thereof.

The process further includes solving for a 2-column matrix $D' = L^{-1} R$, where the values in a first of the columns of D' are estimates of the horizontal offsets of the images relative to the center of the images, and the values in a second of the columns of D' are estimates of the vertical offsets of the images relative to the center of the images.

Finally, the process includes shifting each of the images horizontally and vertically according respectively to the first and second columns of D', and adding the shifted images together to form the composite image.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3B illustrates an example of an $A_{int}$ matrix for N=7, according to embodiments of the present disclosure;

FIG. 4A illustrates a matrix calculation of $D=(A^TWA)^{-1}(A^TWE)$ according to the conventional approach of the prior art to this type of problem;

FIG. 4B illustrates a matrix calculation of $D'=(A_{int}^T W_{int} A_{int})^{-1}(A_{int}^T W_{int} E')$, which represents FIG. 4A adjusted to exploit the dimensional symmetry;

FIG. 4C illustrates a matrix calculation of $D'=L^{-1}R$, according to embodiments of the present disclosure, where the left block presents the matrices with the same scale as in FIGS. 4A and 4B, and the right block presents an enlargement of the matrices that renders the matrix equation contents more visible;

FIG. 5A illustrates the (p,q); E; and w inputs to an example solving the weighted normal equation according to the techniques described in the present disclosure, for use within a tailored robust regression algorithm, where this example captures the major deviation from conventional implementations of the normal equation present in embodiments of the present disclosure;

FIG. 5B illustrates calculation of the matrix H in the example calculation of FIG. 5A;

FIG. 5C illustrates calculation of $G=H+H^T$ in the example calculation of FIG. 5A;

FIG. 5D illustrates calculation of the values along the diagonal of $G_{diag}$ in the example calculation of FIG. 5A;

FIG. 5E illustrates the final definition of the $G_{diag}$ matrix in the example calculation of FIG. 5A;

FIG. 5F illustrates calculation of the matrix L in the example calculation of FIG. 5A;

FIG. 5G illustrates calculation of the matrix $V_{horz}$ in the example calculation of FIG. 5A;

FIG. 5H illustrates calculation of the matrix $V_{vert}$ in the example calculation of FIG. 5A;

FIG. 5I illustrates calculation of the matrix $Z_{horz}$ in the example calculation of FIG. 5A;

FIG. 5J illustrates calculation of the matrix $Z_{vert}$ in the example calculation of FIG. 5A;

FIG. 5K illustrates calculation of the first column of the matrix R in the example calculation of FIG. 5A;

FIG. 5L illustrates calculation of the second column of the matrix R in the example calculation of FIG. 5A;

FIG. 5M illustrates the two-column matrix R that results from FIGS. 5k and 5L in the example calculation of FIG. 5A;

FIG. 5N illustrates calculation of $D'=L^{-1}R$ in the example calculation of FIG. 5A.

DETAILED DESCRIPTION

The present disclosure is a method and apparatus for accurately and efficiently estimating the absolute positional shifts between a plurality of images of a feature, including images where the precise nature of the feature or features is not known a priori.

The disclosed method addresses this problem by using image cross correlations to estimate all of the relative shifts, ($\vec{\delta}_p - \vec{\delta}_q$), and extracts estimates of the absolute shifts, $\vec{\delta}_n$, by relating the relative estimates and absolute shifts in a linear system of equations and solving the system through a tailored robust regression technique. The regression is significantly expedited by tailoring the core matrix arithmetic to take maximum advantage of the sparsity and symmetry of the linear system of equations, as is explained in more detail below.

In some cases, applying pre-processing to the image input data can improve the performance of shift-estimating calculations, for example by improving the validity of the assumptions used in the calculations or tempering the impact of the noise. The choice of what pre-processing should be applied is highly context specific, and depends critically on the nature of the noise and of the signal. Some examples of pre-processing include various forms of smoothing, background subtraction, application of filters, regularization, spatial transformations, up-sampling/down-sampling, and cropping.

If the raw images do not have flat, zero-mean background structure, then measuring and subtracting the background structure can be a powerful step that can remove deterministic sources of spurious correlation features. The background subtraction may be performed using a high-pass spatial filter, mean subtraction, or by some other method that is customized to the specific nature of the background structure and the signal structure.

Figure 1A:
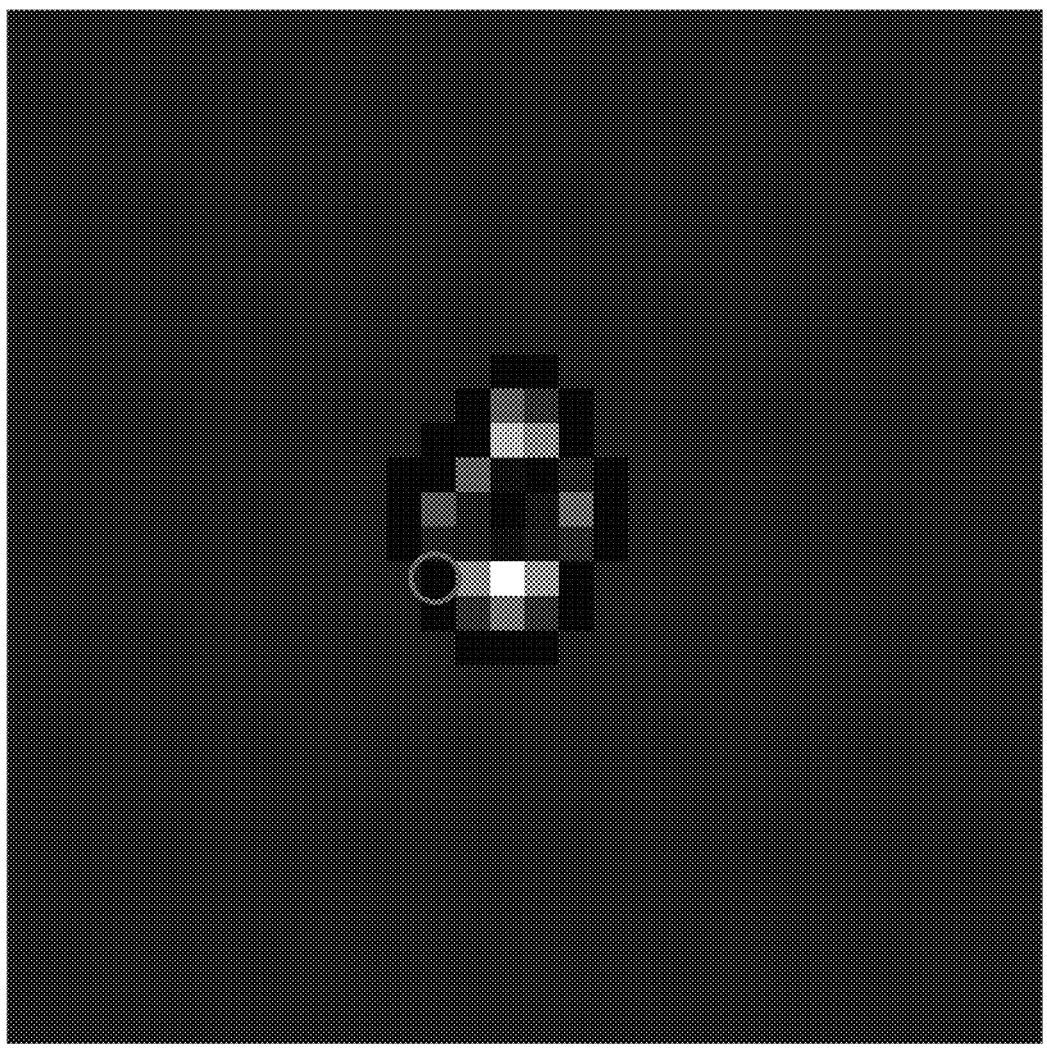
FIG. 1A is a single image of a feature obtained without significant noise according to the prior art.
Figure 1B:
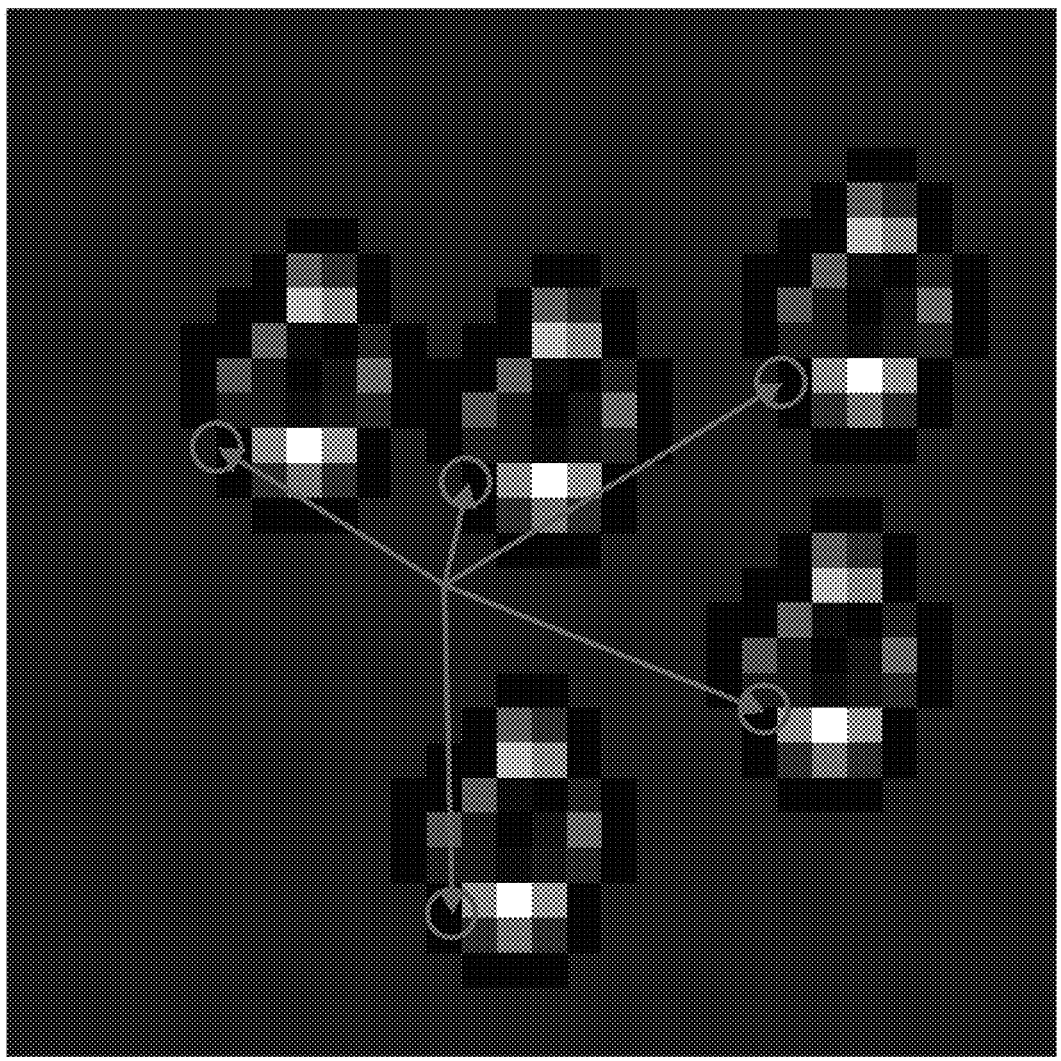
FIG. 1B is a superposition of five images of the feature of FIG. 1A according to the prior art, where each of the images is subject to a random horizontal and vertical offset.
Figure 1C:
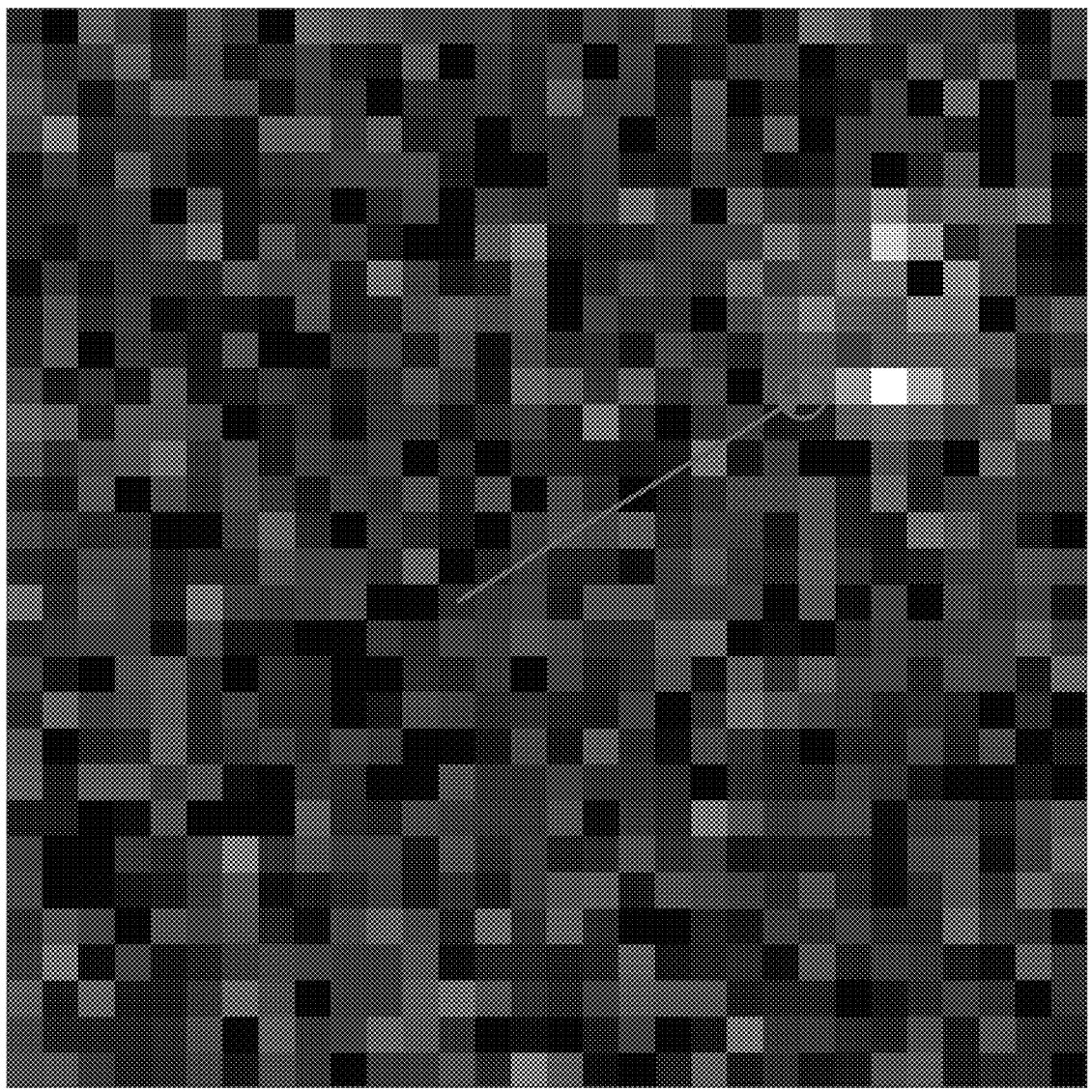
FIG. 1C is a single image, similar to FIG. 1A, but realistically measured in the presence of significant noise according to the prior art.
Figure 1D:
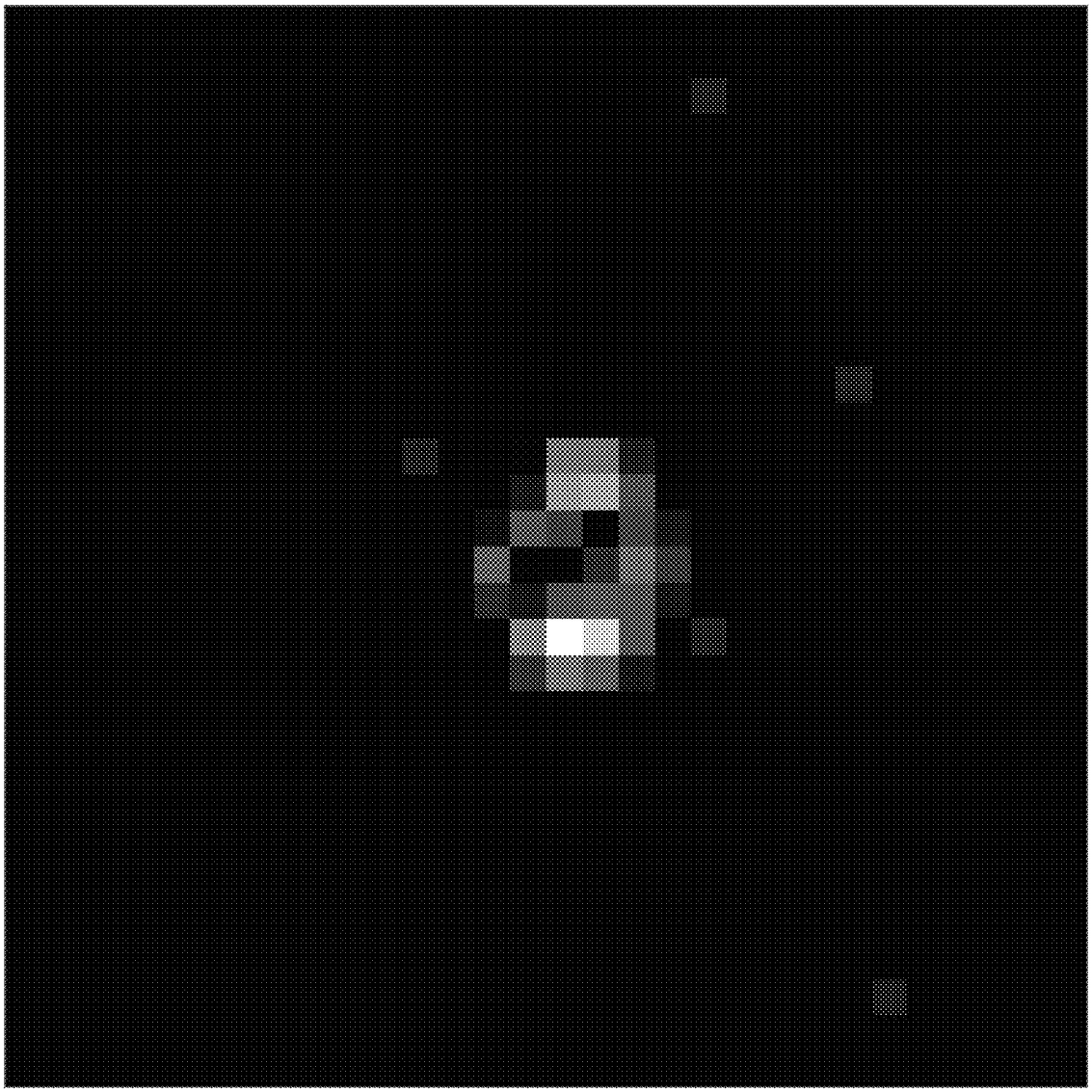
FIG. 1D illustrates the result of summing 50 images that are similar to FIG. 1C after estimating and correcting for the horizontal and vertical shifts of the images according to the prior art.
Figure 2A:
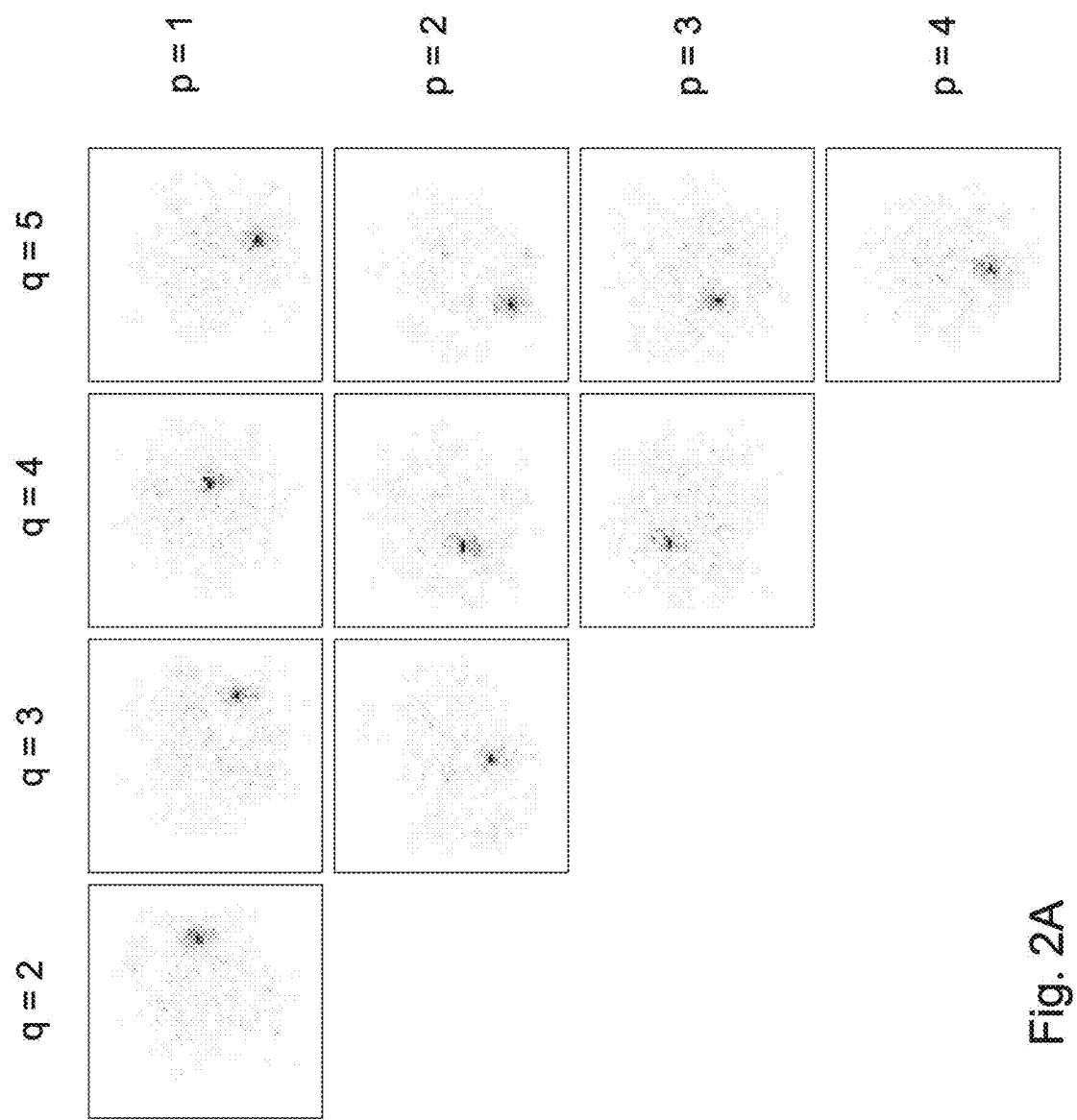
FIG. 2A illustrates an example of cross-correlation peaks applied to five images in a moderately high SNR regime, according to embodiments of the present disclosure.

Once any pre-processing has been applied, the next step is to estimate the relative shifts between $M_p$ and $M_q$, $\vec{d}_{pq}=(\vec{\delta}_p - \vec{\delta}_q)$, by computing 2D cross-correlations between all possible combinations of the measured images, and then "peak-picking" the locations of the correlation peaks, which correspond to estimates of the relative shifts. Each of the 2D cross-correlations provides an estimate of the relative shift between two images that is agnostic to the image content. In the absence of noise, each cross-correlation result would have a peak at a location corresponding to $\vec{d}_{pq}$. Accordingly, estimating the position of the peak in the cross correlation (i.e. peak-finding) yields an estimate of the relative shift between the cross-correlated images. An example of such cross-correlation peaks applied to five images in a moderately high SNR regime is illustrated in FIG. 2A.

In order to extract as much information as possible from the cross correlations, and to corroborate their different estimates, the correlate-and-peak-find process is performed for as many combinations of (p,q) as possible. Naïvely, for a total of N images there are $N^2$ such combinations. However, N of them are autocorrelations whose peaks are trivially located (p=q $\Rightarrow \vec{d}_{pq}=\vec{0}$), and $$\frac{N(N-1)}{2}$$

(about half) are reflection cross-correlations, and are therefore redundant (the correlation results from (p,q) and (q,p) are just reflections of each other). As is illustrated in FIG. 2A, this task reduces to the evaluation of all non-trivial, non-redundant cross correlations: 1≤p≤q≤N, totaling $$\frac{N(N-1)}{2}$$

(p,q) pairs. In FIG. 2A, N=5, resulting in a total of (5*4)/2=10 cross-correlations.

While calculating the cross correlation of two images is a well-defined process, the task of extracting estimates of the locations of its peaks is much less prescribed. In the absence of noise, the cross correlation of two equivalent-but-shifted images is a translated version of the signal autocorrelation which necessarily takes a maximum intensity at its center. Exploiting the presence of this peak, peak-finding is commonly used to estimate relative shifts in this way. In the presence of noise, the location of the cross correlation's peak is either perturbed or overpowered by a spurious noise peak in an unrelated location. The presence of these perturbed peaks and outlier peaks is the primary motivation behind the ensuing robust regression techniques in the present disclosure. The characteristics of each peak is dependent on its underlying signal structure, so implementations of peak-finding are application specific. Some example approaches include finding the maximum intensity cross correlation pixel, and finding the centroid of a region of generally high intensity. The peak-finding will benefit in some cases from pre-processing of the correlations, for example by applying masking, smoothing, and/or other filtering.

In various embodiments, the relative shift estimates can be either nearest-pixel estimates, or can offer sub-pixel accuracy, whereby the estimates yield non-integer estimates for $\vec{\delta}_n$. Pixel-rounded estimates can be less ideal, because of the implicit rounding error, but sub-pixel relative shift estimates need not be inherently more accurate.

The process for calculating cross correlations and estimating peaks involves many independent operations (one for each (p,q)), and as such affords an opportunity for parallelized computing, e.g. through central processing unit (CPU) multithreading, or through exploiting other architectures like graphics processing units (GPUs).

Figure 2B:
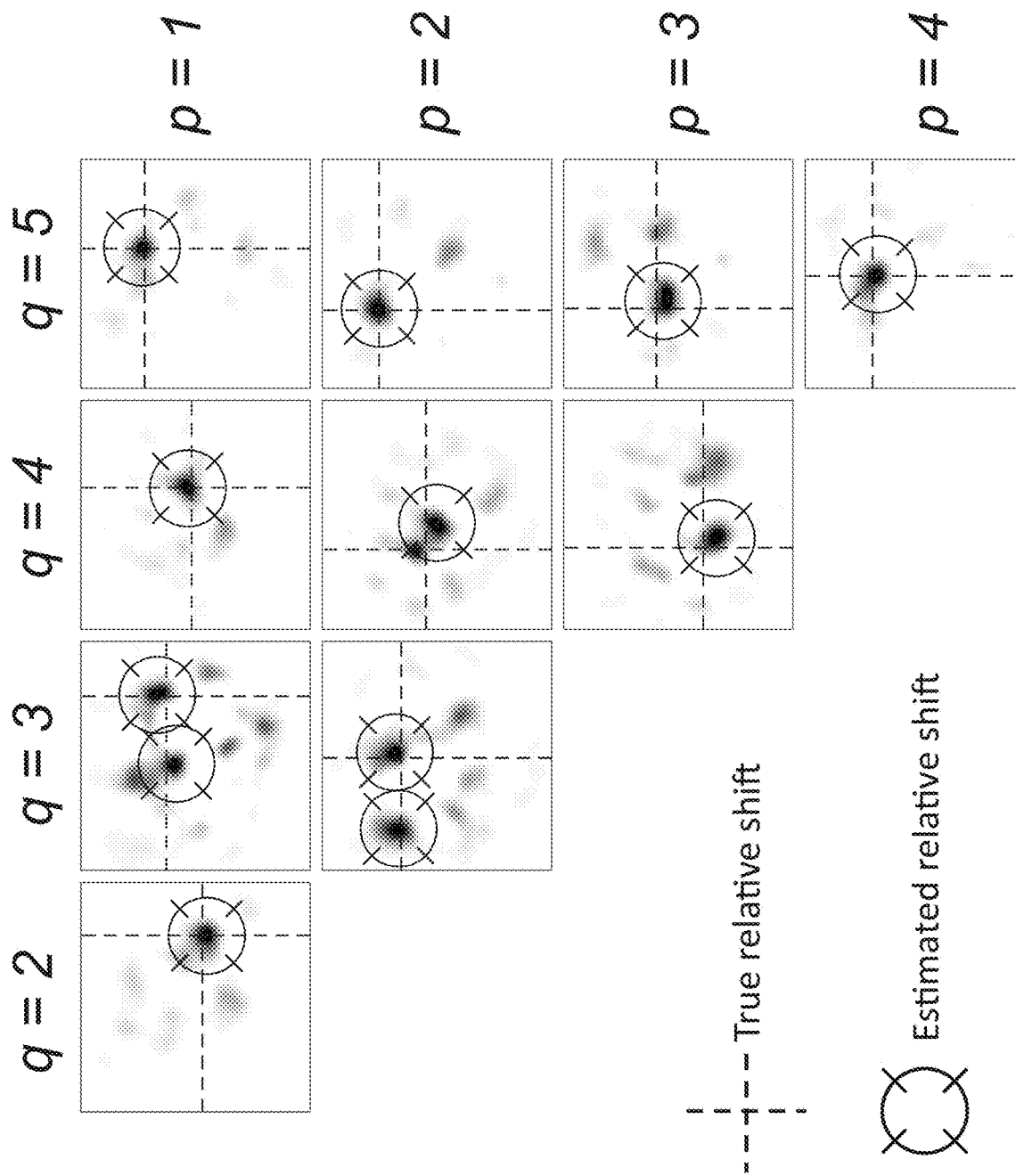
FIG. 2B, illustrates an example of finding more than one peak of similar intensity in cross-correlations, according to embodiments of the present disclosure.

With reference to FIG. 2B, in some cases the peak-finding can result in finding more than one peak of similar intensity in some of the cross-correlations, leading to multiple estimates for the same relative shifts. This can be seen in FIG. 2B for q=3, p=1 and for q=3, p=2. Generally, it can be assumed that one of these estimates will be "real," in that it will result from signal correlations, while the others will be "spurious," in that it will result from accidental noise correlations, and not from signal correlations. This can be seen in FIG. 2B, where in each of the cross-correlations that have two estimates, one of them closely corresponds with the "true" correlation (intersecting dashed lines), while the other does not. Since the robust regression that is described below is (up to a point) resistant to outliers, if there are a few discrepant but similarly dominant estimates of $\vec{d}_{pq}$, retaining all of them will ensure that the "real" estimates are retained, thereby leading to improved estimates.

Figure 3A:
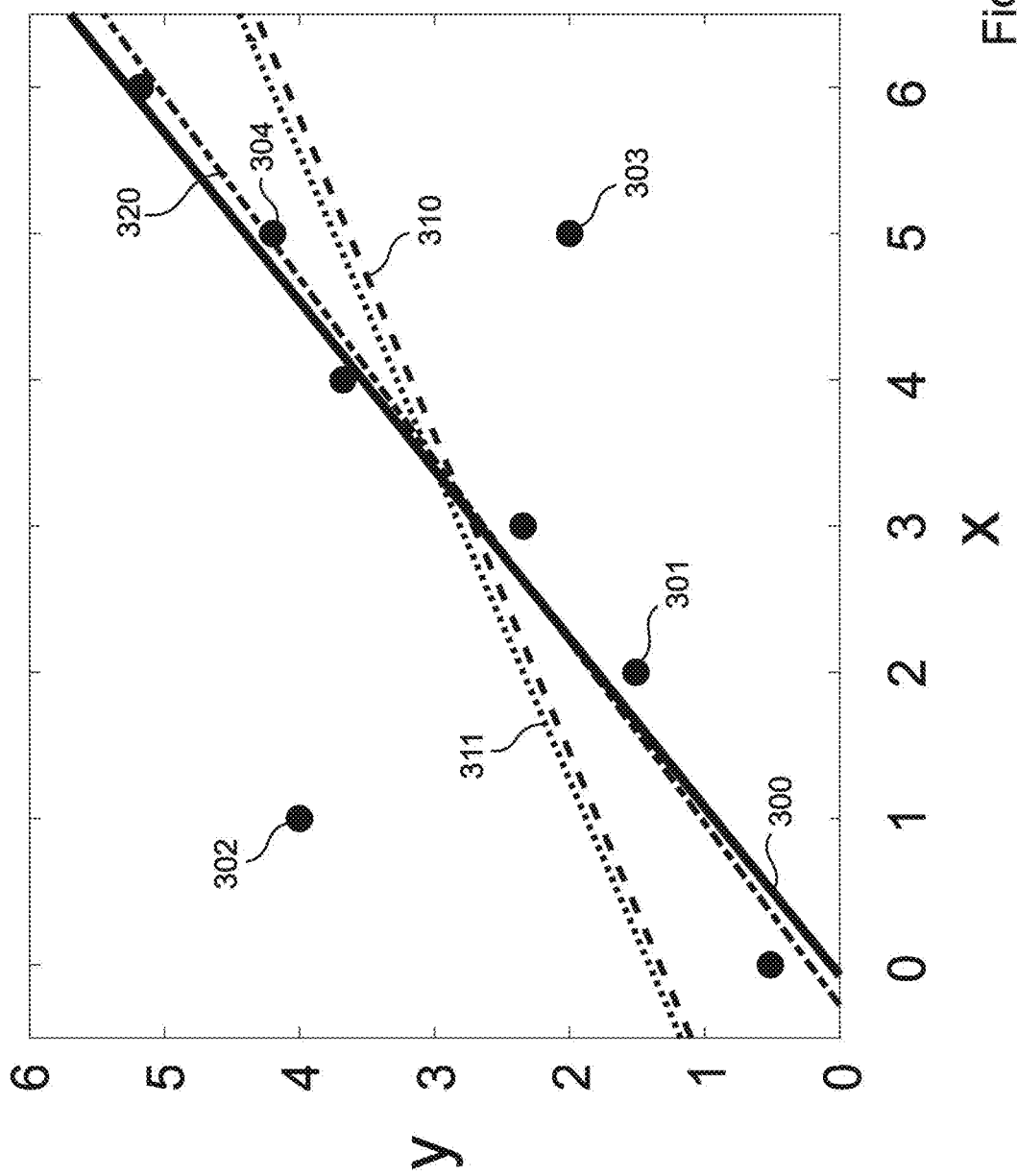
FIG. 3A is a graph illustrating improved performance of a robust regression when applied to a plurality of vertical and horizontal shift estimates that includes some spurious estimates, according to the prior art.

At their core, robust regression techniques search for a consistent trend present in most of the estimates, and treat deviants from that global trend as outliers, and subsequently de-weight them. This de-weighting scheme removes the need to arbitrarily down-select to a single estimate when multiple estimates are similarly viable. An analogous 1D example is illustrated in FIG. 3A, showing many estimates 301 of an underlying truth 300, some of which are spurious 302, 303. Two estimates 303, 304 have been found at x=5 which the estimation scheme could not confidently distinguish between. If only one of the estimates for x=5 is retained, and it is the "wrong" estimate 303 (y=2), then both robust 310 and non-robust 311 regression algorithms can be misled and yield erroneous results. If both of the viable estimates 303, 304 are retained, non-robust techniques are nominally unchanged 311, but robust regression 320 can excel.

Generating multiple estimates of the same relative shift should be done sparingly though, since it will eventually obfuscate the true structure underlying the whole body of estimates by dilution. Equivalently, the multiple instantaneous estimates 303, 304 may create a more challenging initial condition for the regression approach to recover from. Thresholds for how similar two peaks must be within the same cross-correlation to justify retaining both of them, and corresponding limits on multiple-estimate prevalence, are, of course, context and implementation specific.

The result of calculating these cross correlations and performing peak finding is a total of K estimates of the relative shift estimates $\vec{d}_{pq}=(\vec{\delta}_p-\vec{\delta}_q)$, where K will be greater than $$\frac{N(N-1)}{2}$$

if there are multiple estimates for any of the cross-correlation peaks. The next step is to use these relative shift estimates to determine estimates for the absolute shifts $\vec{\delta}_n$. Each $\vec{d}_{pq}$ estimate can be considered to be a measurement of a linear combination of the full list of (unknown) $\vec{\delta}_n$ values. The underlying $\vec{\delta}_n$ values are determined by solving the corresponding system of linear equations by applying a regression algorithm. According to the present disclosure, the regression algorithm is "tailored" so as to be optimized for efficient application to the problem described herein.

Due to the unknown structure of the signal, any definition of the "absolute" shift is necessarily arbitrary. As such, absolute shifts can only be determined up to an arbitrary, global reference point. If the resulting absolute signal placement matters for a specific application, a final shift may be estimated from the superimposed image, which will have much higher SNR due to the improved alignment. Thus, for all intents and purposes, $\vec{\delta}_n$ is interchangeable with ($\vec{\delta}_n - \vec{c}$) for any constant reference $\vec{c}$.

However, due to this ambiguity, the linear system mentioned thus far does not have full rank. Accordingly, an additional constraint is required to render the linear system full rank, and thereby solvable. This amounts to selecting an arbitrary "zero" location within the scene from which the offsets $\vec{\delta}_n$ will be measured. In embodiments, the additional constraint that is imposed is that the sum of the absolute shifts must be equal to zero: $\Sigma_n \vec{\delta}_n = \vec{0}$, and must, therefore, also average to zero. Almost any other similar static constraint can be applied. However, requiring that the sum of the absolute shifts is zero is the least complicating choice.

Most regression algorithms are designed for application to a 1D list of independent variables. When these algorithms are applied to a 2D system, the 2D system is typically represented as the concatenation of the 1D horizontal component sub-system and the 1D vertical component subsystem. This corresponds to concatenating and zero-padding the numeric matrix representations appropriately to capture the simultaneous, independent component equations. The resulting linear system can be expressed as AD=E, where The 2N×1 column vector D captures the horizontal and vertical components of each absolute shift $\vec{\delta}_n$. These are the variables for which the linear system must be solved. As such, its representation here is mainly symbolic, since estimates of these absolute shifts have not yet been determined. The first half corresponds to $\delta_n^{horz}$ and the second with $\delta_n^{vert}$.

The 2(K+1)×1 column vector E represents all of the distinct relative shift estimates and zeros that express the constraint equation. The (p,q) ordering and multiple estimate sub-ordering is arbitrary, but must correspond to the rows of A. The first half of E corresponds to $\delta_n^{horz}$ and the second half of E corresponds with $\delta_n^{vert}$. Vector E is sometimes referred to herein as the "constants" vector, or the "inhomogeneous" vector.

The 2(K+1)×2N coefficients matrix A directly encodes all of the pairs of (p,q) that were cross-correlated (repeating rows for which there were multiple resulting estimates), and also the horizontal and vertical component zero-sum constraints. All of the non-constraint rows are mostly zeros, except for a single +1 corresponding to p and a single −1 corresponding to q. The rows of A correspond to the rows of E, and the columns of A correspond to the rows of D. A is block-diagonal, in that it is composed of a half-size $A_{int}$ intrinsic matrix, and is padded with zeros to keep the horizontal and vertical components of E and D independent.

FIG. 3B illustrates an example of $A_{int}$ for N=7. In the illustrated example, three peaks are picked for the cross-correlation between images 2 and 7 and two peaks are picked for the cross-correlation between images 4 and 5. For all other cross-correlations only one peak is picked. As a result, $$K = \frac{N(N-1)}{2} + 3 = 21 + 3 = 24,$$

where the multiple picked peaks produce 3 extra estimates. Each value of k corresponds with a cross correlation between images $p_k$ and $q_k$, but due to the additional peaks that are picked for some of the cross-correlations, some values of k share the same values of $p_k$ and $q_k$. The (K+1)th row of $A_{int}$ establishes the additional constraint that arises from selection of an arbitrary "center" of the images from which all of the individual offsets $\vec{\delta}_n$ are to be measured. In embodiments, the center is chosen such that the sum of all of the offsets of all of the images is zero.

Due to estimation error and the presence of outliers, this system of linear equations is overdetermined, in that there is no solution for D which satisfies all of the equations, and equivalently the naïve matrix solution $D=A^{-1}E$ is wholly invalid. To counter this common circumstance, a standard approach is to search instead for a "least squares" solutions, i.e. determine the D that minimizes the sum of the squares of the fit residuals: $\Sigma_i((AD)_i - E_i)^2$. In standard practice, this is solved through the corresponding "normal equation," $A^T AD = A^T E$. The solution $D=(A^T A)^{-1}(A^T E)$ is mathematically equivalent to finding the least squares solution. The main benefit of the normal equation is that $A^T A$ is not overdetermined, and has full rank so long as A has full rank, thus guaranteeing the existence of a unique solution. Moreover, the normal equation returns the problem to a matrix arithmetic problem that nearly all computing hardware and coding languages are well equipped to solve.

Outliers in the relative shift estimates forming E present a challenge for a least squares solution, because entries of E which are inconsistent with the majority of the estimates will have a much larger contribution to the sum $\Sigma_i((AD)_i - E_i)^2$. Regression techniques that are intentionally-designed to handle these outliers are referred to as "robust". A technique that is applied by many such robust regression implementations is to generate a weighted least squares solution instead of an ordinary least squares solution. Given a list of nonnegative weights $w_i$ corresponding to entries in E, the weighted least squares solution minimizes $\Sigma_i w_i \cdot ((AD)_i - E_i)^2$, wherein the square of the residuals has a "weighted" contribution to the sum.

With reference to FIG. 4A, the corresponding weighted normal equation is $A^T WAD = A^T WE$, whose solution is similarly $D=(A^T WA)^{-1}(A^T WE)$, where W is the square matrix filled with the weights $w_i$ placed along its diagonal, all other values being zero. This weighted approach allows the influence of individual relative shift estimates be tuned by the selection of their weights, where estimates having larger weights have a greater effect on the final solution, whereas estimates having weights that are close to zero have very little effect on the result. Weights equal to zero are equivalent to the omission of that estimate from the linear system. It should be noted that the non-weighted least squares approach is a special case of the weighted least squares approach, wherein all the weights are equal.

Examples of weighted robust regression algorithms include:
   Iterative re-weighted least squares approaches, wherein the weights of the weighted least squares solution are iteratively updated until the corresponding fit stabilizes. The weights for the first fit are assumed to be all equal. The weights for the next solution are formed based on the residuals of the previous solution. As a result, statistically outlying residuals are systematically de-weighted, thereby lowering or preventing their influence in the next iteration. Even within this framework, the conversion from residuals to weights affords the implementation significant flexibility.

Unsupervised anomaly detection approaches which feed into a final weighted least squares solution. A broad range of techniques are available to systematically detect outliers from the population of estimates, including: density/clustering analyses which declare groups of estimates non-outliers if they are in close proximity, and leverage estimators that compare the resulting fit outcome when omitting specific estimates. These techniques then derive the weights from these outlier detection metrics for the final fit, specifically aiming to de-weight those estimates that are more likely to be outliers.

Since these approaches are all directed to solving the (weighted) least squares problem, the aforementioned normal equation constitutes some or much of their operation. Because of this commonality, the method of the present disclosure implements improvements to these core computations, which can then be applied to implicitly improve the execution speed of the robust regression. In particular, the robust regression implementation of the present disclosure is tailored in the following ways:

Exploiting the horizontal/vertical component symmetry in the linear system to remove redundancy from the problem solving;

Analytically calculating portions of the weighed normal equation, to significantly reduce code memory demands and circumvent major run-time computation steps; and Modifying how residuals and weights are calculated to accommodate the tailored linear system representation and to better embody the properties of the relative shift estimation scheme.

Exploiting Dimensional Symmetry

According to the present disclosure, each of the relative shifts $\vec{d}_{pq}$ represents a pair of estimates, the horizontal and vertical components, which are intrinsically tied to each other. Due to that direct component relationship and the internal correspondence within the linear system AD=E, there is an inherent symmetry in the contents of the coefficients matrix A. As can be seen in FIG. 4A, this symmetry is rather obvious in the various appearances of the A matrix, through the repeated presence of the (K+1)×N intrinsic coefficients matrix $A_{int}$.

Because of this, the linear system can be represented by an equivalent matrix equation $A_{int}D'=E'$, where D' and E' are N×2 and (K+1)×2 matrices, respectively. According to this approach, instead of concatenating the horizontal and vertical components into a long vector, as with D and E, they now form two separate columns of D' and E', where the rows of each represent the pairs of $\delta_n^{horz}$ and $\delta_n^{vert}$, or $d_k^{horz}$ and $d_k^{vert}$, respectively.

This represents a departure from standard linear system representations that may not be compatible with conventional robust regression algorithms.

Modifications of such conventional algorithms that may be necessary to restore compatibility can include changes to bookkeeping items, to the residual analysis, to the anomaly detection details, and/or to the weight generation.

Notably, the weights matrix W is also affected. Rather than independently determining the weights for the horizontal and vertical components of a relative shift estimate, this approach forces the weights of the respective horizontal and vertical components to be equal, i.e. the weights are applied on a per-estimate-vector basis, rather than on a per-estimate-component basis. This requirement is consistent with the nature of the specific problem of image registration, in that a peak that is "found" in a cross-correlation will either be a signal correlation, i.e. a "true" peak, or a noise correlation, i.e. a "false" peak, such that both of the horizontal and vertical components of the peak will be either true or false. This intrinsic set of weights is then captured in a (K+1)×(K+1) matrix $W_{int}$, which includes the estimate-vector weights $w_k$ along its diagonal, and is terminated with the constraint equation's weight.

According to the present method, the normal equation is equivalently transformed to yield a solution for the new system: $D'=(A_{int}^T W_{int} A_{int})^{-1}(A_{int}^T W_{int} E')$. This equation is illustrated in FIG. 4B.

Analytically Condensing the Weighted Normal Equation

The approach described above for exploiting the dimensional symmetry of the problem reduces the amount of computer memory that is required to store A by a factor of four, and enables the direct use of the intrinsic $A_{int}$. Nevertheless, $A_{int}$ can still be very tall (dimensions $\mathcal{O}(N^2)\times N$). As a result, matrix arithmetic operations necessitated by the normal equation can become slow at even moderately large N. Because $A_{int}$ is rather sparse (only 1/N of the entries are nonzero) and has a great deal of structure to it, the present method is able to further increase the computational speed and decrease the computational storage demands by performing several of the intermediate operations analytically. In particular, according to embodiments of the present disclosure, the coefficients matrix $A_{int}^T W_{int} A_{int}$ and the inhomogeneous matrix $A_{int}^T W_{int} E'$ are determined directly by circumventing conventional computational approaches. According to this approach, the inputs are the matrix E' and the list of weights $w_k$ ($1 \le k \le K$ denotes estimate weights, and $w_{K+1}$ is the constraint weight).

Analytic Shortcut to Determining the Coefficients Matrix

The normal equation's coefficients matrix $A_{int}^T W_{int} A_{int}$ is traditionally calculated through a plurality of matrix transposition and multiplication operations. However, according to embodiments of the present disclosure, the coefficients matrix is calculated analytically, thereby producing the same resulting matrix while considerably reducing the demands placed on the available computing resources, and thereby reducing the execution time. According to the present disclosure, $A_{int}^T W_{int} A_{int}=L$ is computed according to the following steps:

Calculate an N×N matrix H by inserting each non-constraint weight $w_k$ into its $(p_k)$th row and $(q_k)$th column, where the kth relative shift estimate corresponds to $\vec{d}_{p_k q_k}$. If multiple weights map to the same matrix entry, sum their respective weights before insertion. This matrix will be strictly upper triangular, having zeros on and below the diagonal;

Calculate an N×N matrix $G=H+H^T$; and

Calculate the value for the N×N matrix $L=w_K 1_{N \times N}+\text{diag}(\Sigma_i(G)_{ij})-G$, where $1_{N \times N}$ is the N×N matrix filled with ones, $\Sigma_i(G)_{ij}$ sums over all the rows of G (leaving a vector), and $\text{diag}(\Sigma_i(G)_{ij})$ generates a diagonal square matrix with the values of that vector along its diagonal.

Analytic Shortcut to Determining the Inhomogeneous Matrix

According to the present disclosure, the normal equation's inhomogeneous matrix $A_{int}^T W_{int} E'$ is calculated analytically in a similar manner to produce the same result with similar reductions in computing resource demands and execution time. Specifically, the inhomogeneous matrix $A_{int}^T W_{int} E' = R$ is calculated according to the following steps:

Calculate an N×N matrix $V^{horz}$ by inserting $w_k(E')_{k,1}$ into its $(p_k)$th row and $(q_k)$th column, where the kth relative shift estimate $\vec{e}_k$ corresponds to $\vec{d}_{p_k q_k}$ and $(E')_{k,1}$ corresponds to the horizontal component. If multiple terms map to the same matrix entry, sum their respective contributions before insertion. Disregard the constraint entry of E', namely $(E')_{K+1,1}$, since it is zero by construction;

Calculate an N×N matrix $V^{vert}$, following the same procedures as for $V^{horz}$, but using the vertical components $(E')_{k,2}$ instead of $(E')_{k,1}$;

Calculate N×N matrices $Z^{horz} = V^{horz} - (V^{horz})^T$ and $Z^{vert} = V^{vert} - (V^{vert})^T$; and Calculate the N×2 matrix R whose first column is $\Sigma_{j=1}^N Z_{nj}^{horz}$ and second column is $\Sigma_{j=1}^N Z_{nj}^{vert}$.

Results of the Analytically Condensed Normal Equation

The result of the above steps is a consistent, full rank, linear system solution of the form $D' = L^{-1} R$, as illustrated in FIG. 4C, where only matrix inversion is required. The intermediate results L and R require nominally the same amount of computation time to populate as $A_{int}$ would have required, and avoid the need for significant intermediate computations and storage requirements. These schemes replace the $\mathcal{O}(N^4)$ computation complexity with $\mathcal{O}(N^2)$, with the exception of the matrix inverse operation ($\mathcal{O}(N^3)$ complexity), which is highly optimized, and is not a concern unless N is very large. Thus, this may approximately be interpreted as an $N^2$ increase in computational speed and reduction in computational storage.

Further Consideration of Residuals and Weights

Alongside the algorithm tailoring described above for solving variants of the linear system, common mechanisms in the periphery can play similarly critical roles in the overall performance of the robust algorithm's behavior. Two of the more important and global features are the handling of fit residuals and the generation of weight values.

According to the present disclosure, calculation of the fit residuals goes beyond merely evaluating E-AD, because the matrix A is no longer explicitly calculated. According to the present disclosure, the residuals are instead calculated with $(E')_{k,d} - ((D')_{p_k,d} - (D')_{q_k,d})$ where d=0.1 determines if the horizontal or vertical residual component is being calculated, and D' is the estimated absolute shift matrix.

In addition to tailoring the calculation of the residuals, embodiments of the present disclosure also tailor their subsequent use. Since most robust regression algorithms are constructed to process a list of scalar residual measurements, one direct way to re-establish compatibility with the surrounding algorithm is to convert the coupled horizontal and vertical residuals to a scalar residual representation. This can be done, for example, through a root-sum-square (RSS) operation, or by taking the maximum or average of their individual magnitudes. However, this must be done with care, since many algorithms assume some form of distribution on the residuals to enable anomaly detection techniques, so the statistical analysis may need tailoring to compensate.

Similarly, the robust regression's implementation may try to determine weights for each estimate-component, but as previously mentioned, this must be forced to generate weights for each estimate-vector. In embodiments, a scalar representation of the 2D raw residuals is supplied to algorithms that estimate weights using the residuals. In various embodiments, algorithms that estimate the weights through some means of omission of estimates are forced to omit the corresponding pairs of horizontal and vertical component estimates in tandem. The weight determination process is artificially prevented from giving the constraint equation zero weight. Any constraint weight $w_{K+1} > 0$ will deliver exactly the same weighted normal equation solution, so this demand is minimal.

Robust Regression Tailoring Example

Following is an example calculation based on a tailored "iteratively re-weighted least squares fit" algorithm applied to the cross-correlation estimates presented in FIG. 2B, where the calculation follows the method of analytically condensing the weighted normal equation that is disclosed above. The weights used in this example correspond to the second such iteration, where the weights are not all equal. The (p,q); E; and w inputs to this calculation are illustrated by the matrices in FIG. 5A. The value of the constraint weight $w_{constraint}$ is set to 1 in this example. Calculation of the matrix H is shown in FIG. 5B, where, for example, $w_{11}$ is inserted into row 3, column 5, because $p_{11} = 3$ and $q_{11} = 5$.

Figure 5D:
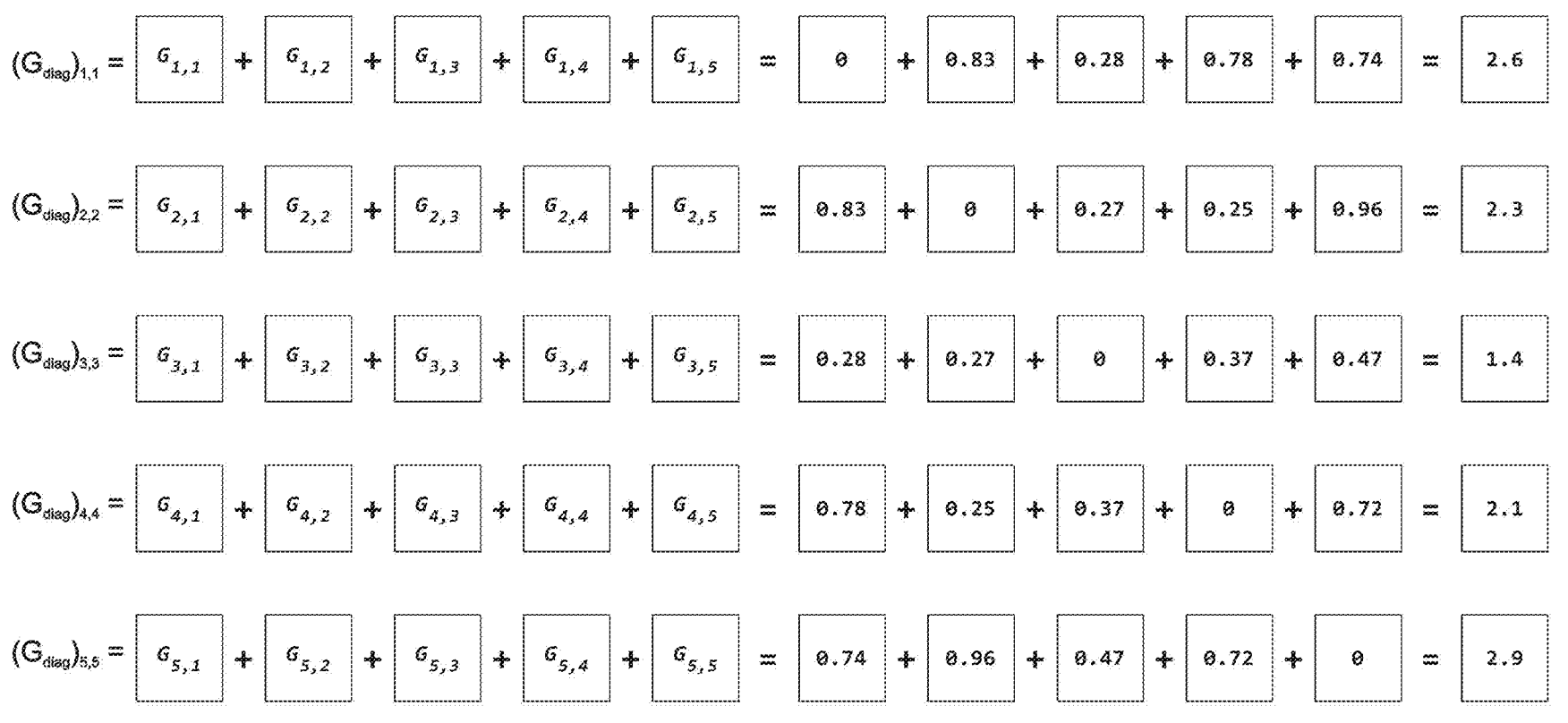

The next step is to calculate $G = H + H^T$, as illustrated in FIG. 5C. Subsequently, the values in G are used to calculate the values along the diagonal of $G_{diag}$. The process of calculating these diagonal values by summing along G's rows is illustrated in FIG. 5D, and the final definition of the $G_{diag}$ matrix is captured in FIG. 5E. Next, L is calculated as being equal to $w_{constraint} \cdot 1_{N \times N} + G_{diag} - G$, as illustrated in FIG. 5F.

Calculation of $V_{horz}$ is illustrated in FIG. 5G, and calculation of $V_{vert}$ is illustrated in FIG. 5H. Note that, for example, $w_{11} \cdot E_{11,1}$ is inserted into row 3, column 5 of $V_{horz}$ because $p_{11} = 3$ and $q_{11} = 5$. Calculation of $Z_{horz}$ and $Z_{vert}$ is illustrated in FIGS. 5I and 5J, where $Z_{horz} = V_{horz} - V_{horz}^T$ and $Z_{vert} = V_{vert} - V_{vert}^T$.

Calculation of the elements of R is illustrated in FIGS. 5K and 5L, with the resulting two-column matrix being illustrated in FIG. 5M. Finally, calculation of $D' = L^{-1} R$ is illustrated in FIG. 5N, where "×" denotes standard matrix multiplication, and where the inverse of L, i.e. $L^{-1}$, is calculated using a conventional matrix inversion algorithm.

Figure 6:
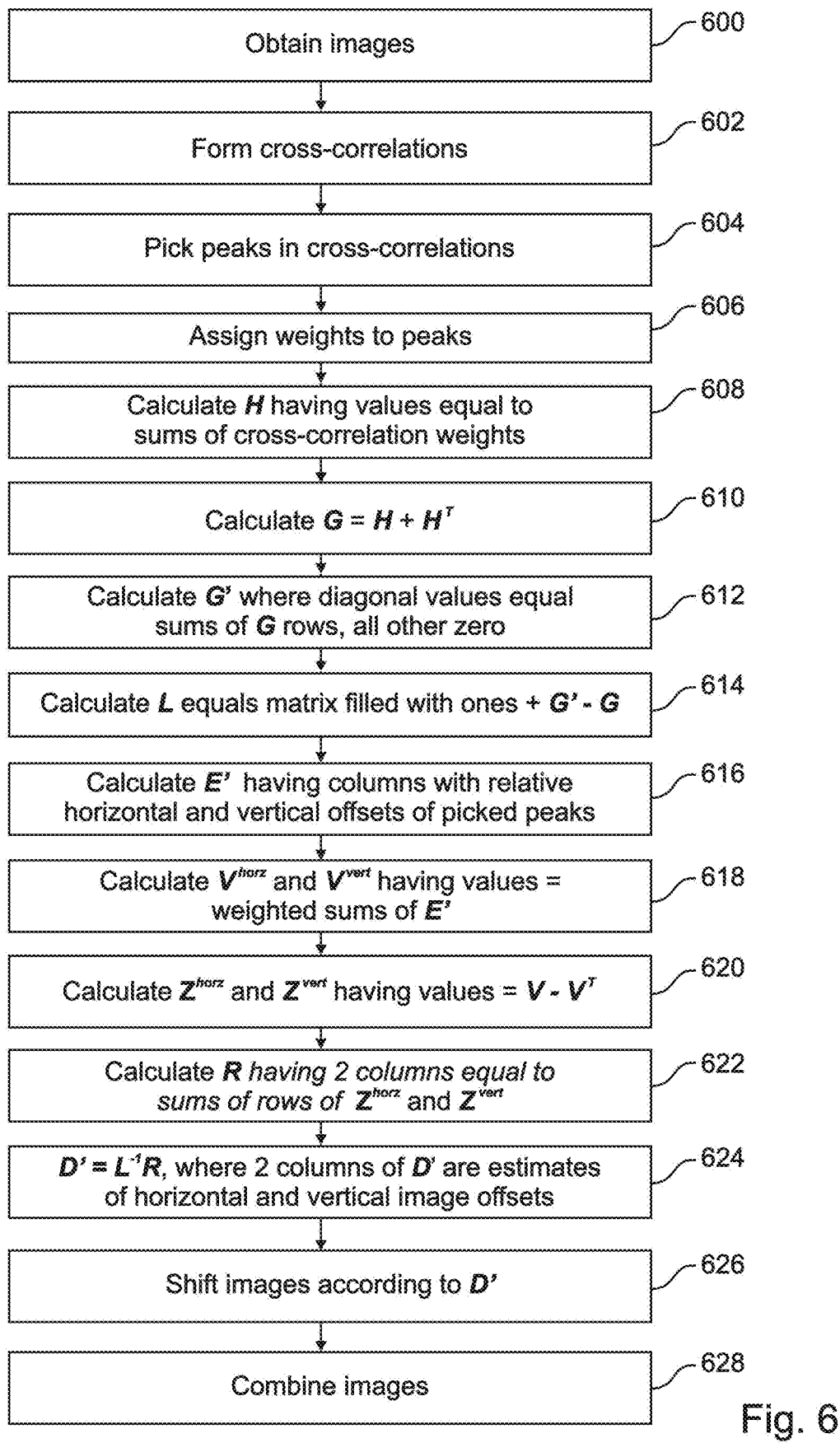
FIG. 6 is a flow diagram that illustrates an embodiment of the present disclosure.

To summarize, with reference to FIG. 6, in embodiments the disclosed method begins with obtaining a plurality of images of a scene 600, the images having unknown, random vertical and horizontal offsets relative to a center of the images, each of the images being a combination of signal and noise, the center of the images being defined such that averages of both the horizontal offsets and the vertical offsets are zero.

The method continues by forming a plurality of cross-correlations of the images 602, where each of the images is cross-correlated with each of the other images, while all auto-correlations and reflections are omitted, each of the cross-correlations being a cross-correlation of an associated pair of the images;

For each of the cross-correlations, at least one peak is picked 604 as an estimate of a relative offset between its associated images, each of said relative offsets comprising a relative horizontal offset component and a relative vertical offset component. Weights are assigned 606 to each of the picked peaks.

A matrix H is then calculated 608 having rows and columns corresponding to the images, wherein for each of the cross-correlations, a value of H at a row and column corresponding to the pair of images associated with the cross-correlation is equal to a sum of all weights assigned to peaks picked in the cross-correlation, and wherein all other values within H are zero, and a matrix G is calculated 610 that is equal to a sum of H and its transpose $H^T$;

A matrix G' is calculated 612, wherein each diagonal value of G' is equal to a sum of the values of the corresponding row of G, and all other values of G' are zero. A matrix Q is then formed that is filled with ones and has a dimensionality equal to a dimensionality of G, and a matrix L is calculated 614 that is equal to Q+G'−G.

A 2-column matrix E' is then formed 616, wherein the rows of E' correspond with the peaks that were picked for the cross-correlations, and wherein the first column of E' comprises the relative horizontal offset components of the picked peaks, and the second column of E' comprises the relative vertical offset components of the picked peaks;

Matrices $V^{horz}$ and $V^{vert}$ are calculated 618 having rows and columns corresponding to the images, wherein for each of the cross-correlations, values of $V^{horz}$ and $V^{vert}$ at rows and columns corresponding to the pair of images associated with the cross-correlation are equal to sums of all of the weights of the peaks that were picked for the cross-correlation multiplied by the value of the first and second columns of E' respectively in the row that corresponds to the picked peak. Matrices $Z^{horz}=V^{horz}-(V^{horz})^T$ and $Z^{vert}=V^{vert}-(V^{vert})^T$ are then calculated 620.

A 2-column matrix R is calculated 622, wherein the rows of R correspond with the images of the scene, wherein each of the values of the first column of R is equal to a sum of all of the values of $Z^{horz}$ in the corresponding row thereof, and each of the values of the second of the columns of R is equal to a sum of all of the values of $Z^{vert}$ in the corresponding row thereof.

A 2-column matrix $D'=L^{-1}R$ is then solved for 624, where the values in the first column of D' are estimates of the horizontal offsets of the images relative to the center of the images, and the values in the second column of D' are estimates of the vertical offsets of the images relative to the center of the images.

Finally, each of the images is shifted horizontally and vertically according respectively to the first and second columns of D' 626, and the shifted images are added together 628 to form the composite image.

It should be noted that, in embodiments, steps 616-622 will either be executed after steps 608-614, as shown in FIG. 6, or will be executed before or in parallel to steps 608-614. This affords opportunities to further reduce the time required to complete the method.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

I claim:

1. A method of combining a plurality of images of a scene having random mutual offsets to form a composite image having increased signal-to-noise, the method comprising:

obtaining the plurality of images of the scene, the images having unknown, random vertical and horizontal offsets relative to a center of the images, each of the images being a combination of signal and noise, the center of the images being defined such that averages of both the horizontal offsets and the vertical offsets are zero;

forming a plurality of cross-correlations of the images, where each of the images is cross-correlated with each of the other images, while all auto-correlations and reflections are omitted, each of the cross-correlations being a cross-correlation of an associated pair of the images;

for each of the cross-correlations, picking at least one peak as an estimate of a relative offset between its associated images, each of said relative offsets comprising a relative horizontal offset component and a relative vertical offset component;

assigning a weight to each of the picked peaks;

calculating a matrix H having rows and columns corresponding to the images, wherein for each of the cross-correlations, a value of Hat a row and column corresponding to the pair of images associated with the cross-correlation is equal to a sum of all weights assigned to peaks picked in the cross-correlation, and wherein all other values within Hare zero;

calculating a matrix G that is equal to a sum of Hand its transpose $H^T$;

calculating a matrix G' wherein each diagonal value of G' is equal to a sum of values of a corresponding row of G, and all other values of G' are zero;

forming a matrix Q filled with ones having a dimensionality equal to a dimensionality of G;

calculating a matrix L that is equal to Q+G'−G;

forming a 2-column matrix E', wherein the rows of E' correspond with the peaks that were picked for the cross-correlations, and wherein a first of the columns of E' comprises the relative horizontal offset components of the picked peaks, and a second of the columns of E' comprises the relative vertical offset components of the picked peaks;

calculating a matrix $V^{horz}$ having rows and columns corresponding to the images, wherein for each of the cross-correlations, a value of $V^{horz}$ at a row and column corresponding to the pair of images associated with the cross-correlation is equal to a sum of all of the weights of the at least one peak that was picked for the cross-correlation multiplied by a value of the first column of E' in a row that corresponds to the at least one peak that was picked for the cross-correlation;

calculating a matrix $V^{vert}$ having rows and columns corresponding to the images, wherein for each of the cross-correlations, a value of Wert at a row and column corresponding to the pair of images associated with the cross-correlation is equal to a sum of all of the weights of the at least one peak that was picked for the cross-correlation multiplied by a value of the second column of E' in a row that corresponds to the at least one peak that was picked for the cross-correlation;

calculating matrices $Z^{horz}=V^{horz}-(V^{horz})$ T and $Z^{vert}=V^{vert}-(V^{vert})$ T;

calculating a 2-column matrix R, wherein the rows of R correspond with the images of the scene, wherein each of the values of R in a first of the columns of R is equal to a sum of all of the values of $Z^{horz}$ in a corresponding row thereof, and each of the values of R in a second of the columns of R is equal to a sum of all of the values of $Z^{vert}$ in a corresponding row thereof;

solving for a 2-column matrix $D'=L^{-1}R$, where the values in a first of the columns of D' are estimates of the horizontal offsets of the images relative to the center of the images, and the values in a second of the columns of D' are estimates of the vertical offsets of the images relative to the center of the images;

shifting each of the images horizontally and vertically according, respectively, to the first and second columns of D'; and adding the shifted images together to form the composite image.

2. The method of claim 1, further comprising applying pre-processing to the images before forming the plurality of cross-correlations.

3. The method of claim 2, wherein the pre-processing includes at least one of smoothing, background subtraction, filtering, regularization, special transformation, up-sampling, down-sampling, and cropping.

4. The method of claim 1, wherein picking at least one peak for at least one of the cross-correlations includes finding a maximum intensity pixel of the cross-correlation.

5. The method of claim 1, wherein picking at least one peak for at least one of the cross-correlations includes finding a centroid of a region of relatively high intensity in the at least one of the cross-correlations.

6. The method of claim 1, wherein the weights are determined according to a degree of confidence that a corresponding peak is an outlier.

7. The method of claim 1, wherein values of the weights are iteratively updated until a corresponding fit stabilizes.

8. The method of claim 1, wherein for each of the peaks, the weight that is assigned to the peak is determined by unsupervised anomaly detection according to a degree of confidence that the peak is an outlier.

9. A method of combining a plurality of N images of a scene having random mutual offsets to form a composite image having increased signal-to-noise, the method comprising:

obtaining the plurality of N images of the scene, the images having unknown, random vertical $\delta_n^{vert}$ and horizontal $\delta_n^{horz}$ offsets relative to a center of the images, where n=1 to N, each of said offsets being expressed as a vector $\vec{\delta}_n = (\delta_n^{horz}, \& \delta_n^{vert})$, each of the images being a combination of signal and noise;

forming a plurality of cross-correlations $X_{p,q}$ of the images, where each of 9 the images is cross-correlated with each of the other images, while all auto-correlations $X_{p,p}$ and reflections $X_{q,p}$ are omitted, resulting in $$\frac{N(N-1)}{2}$$

cross-correlations $X_{p,q}$;

for each of the cross-correlations $X_{p,q}$, picking at least one peak as an estimate $\vec{d}_k$ of a relative offset $\vec{d}_{p,q} = \vec{\delta}_p - \vec{\delta}_q = (\delta_p^{horz} - \delta_q^{horz}, \delta_p^{vert} - \delta_q^{vert})$ between image p and image q, where a total number K of estimates $\vec{d}_x$, is equal to or greater than $$\frac{N(N-1)}{2},$$

and wherein at least one peak is picked for each of the cross-correlations $X_{p,q}$;

forming a K×2 matrix E' wherein for k=1 to K, $E'_{k,1}=d_k^{horz}$ and $E'_{k,2}=d_k^{vert}$;

solving for an N×2 matrix D', where for each n=1 to N, $D'_{n,1}$ is an estimate of $\delta_n^{horz}$ and $D'_{n,2}=0$ is an estimate of $\delta_n^{vert}$ by selecting the center of the images such that $\Sigma_{n=1}^N D'_{n,1}=0$ and $\Sigma_{n=1}^N D'_{n,2}=0$, and applying a weighted regression to an equation $D'=(A_{int}^T W_{int} A_{int})^{-1} (A_{int}^T W_{int} E')$, wherein applying said weighted regression includes:

solving an equation $A_{int}^T W_{int} A_{int} = L$ according to the following steps:

calculating an N×N matrix H, wherein for each of the cross-correlations $X_{p,q}$, $H_{p,q}$ is equal to a sum of all weights $w_k$ for which $p_k=p$ and $q_k=q$, and wherein all other values within H are zero;

calculating an N×N matrix $G=H+H^T$; and calculating the N×N matrix L according to $L= W_K 1_{N\times N}+\text{diag}(\Sigma_{i=1}^N (G)_{i,j})-G$, wherein:

$1_{N\times N}$ is an N×N matrix filled with ones;

$\Sigma_{i=1}^N (G)_{i,j}$ sums over all rows i of G, resulting in a column vector $G_j$; and $\text{diag}(\Sigma_{i=1}^N (G)_{i,j})$ generates a square matrix having a jth diagonal entry=$G_j$, and all off-diagonal values=0; and solving an equation $A_{int}^T W_{int} E'=R$ according to the following steps:

calculating an N×N matrix $V^{horz}$, wherein for each of the cross-correlations $X_{p,q}$, $V^{horz}$ is equal a sum of $W_k (E')_{k,1}$ over all k for which $p_k=p$ and $q_k=q$;

calculating an N×N matrix $V^{vert}$, wherein for each of the cross-correlations $X_{p,q}$, $V_{p,q}^{vert}$ is equal a sum of $W_k(E')_{k,2}$ over all k for which $p_k=p$ and $q_k=q$;

calculating N×N matrices $Z^{horz}=V^{horz}-(V^{horz})^T$ and $Z^{vert}=V^{vert}-(V^{vert})^T$;

calculating the N×2 matrix R, wherein $R_{i,1}=\Sigma_{j=1}^N Z_{ij}^{horz}$ and $R_{i,2}=\Sigma_{j=1}^N Z_{ij}^{vert}$; and calculating $D'=L_{-1}R$;

shifting each of the images n=1 to N horizontally and vertically according, respectively, to $D'_{n,1}$ and $D'_{n,2}$, and adding the shifted images together to form the composite image.

10. The method of claim 9, further comprising applying pre-processing to the images before forming the plurality of cross-correlations.

11. The method of claim 10, wherein the pre-processing includes at least one of smoothing, background subtraction, filtering, regularization, special transformation, up-sampling, down-sampling, and cropping.

12. The method of claim 9, wherein picking at least one peak for at least one of the cross-correlations $X_{p,q}$ includes finding a maximum intensity pixel of $X_{p,q}$.

13. The method of claim 9, wherein picking at least one peak for at least one of the cross-correlations $X_{p,q}$ includes finding a centroid of a region of relatively high intensity in $X_{p,q}$.

14. The method of claim 9, wherein applying the weighted regression includes applying an iterative re-weighted least squares regression wherein values of $W_k$ are iteratively updated until a corresponding fit stabilizes.

15. The method of claim 9, wherein applying the weighted regression includes determining the weights by unsupervised anomaly detection, wherein for each value of k=1 to K, the value of $w_k$ is determined according to a degree of confidence that $\vec{d}_k$ is an outlier.

16. A non-transitory computer readable storage medium having instructions stored thereon that, when executed by a computing device, combine a plurality of images of a scene according to a process comprising:
   obtaining plurality of images of scene, the images having unknown, random vertical and horizontal offsets relative to a center of the images, each of the images being a combination of signal and noise, the center of the images being defined such that averages of both the horizontal offsets and the vertical offsets are zero;
   forming a plurality of cross-correlations of the images, where each of the images is cross-correlated with each of the other images, while all auto-correlations and reflections are omitted, each of the cross-correlations being a cross-correlation of an associated pair of the images;
   for each of the cross-correlations, picking at least one peak as an estimate of a relative offset between its associated images, each of said relative offsets comprising a relative horizontal offset component and a relative vertical offset component;
   assigning a weight to each of the picked peaks;
   calculating a matrix H having rows and columns corresponding to the images, wherein for each of the cross-correlations, a value of H at a row and column corresponding to the pair of images associated with the cross-correlation is equal to a sum of all weights assigned to peaks picked in the cross-correlation, and wherein all other values within H are zero;
   calculating a matrix G that is equal to a sum of H and its transpose $H^T$;
   calculating a matrix G' wherein each diagonal value of G' is equal to a sum of values of a corresponding row of G, and all other values of G' are zero;
   forming a matrix Q filled with ones having a dimensionality equal to a dimensionality of G;
   calculating a matrix L that is equal to Q+G'−G;
   forming a 2-column matrix E', wherein the rows of E' correspond with the peaks that were picked for the cross-correlations, and wherein a first of the columns of E' comprises the relative horizontal offset components of the picked peaks, and a second of the columns of E' comprises the relative vertical offset components of the picked peaks;
   calculating a matrix $V^{horz}$ having rows and columns corresponding to the images, wherein for each of the cross-correlations, a value of $V^{horz}$ at a row and column corresponding to the pair of images associated with the cross-correlation is equal to a sum of all of the weights of the at least one peak that was picked for the cross-correlation multiplied by a value of the first column of E' in a row that corresponds to the at least one peak that was picked for the cross-correlation;
   calculating a matrix $V^{vert}$ having rows and columns corresponding to the images, wherein for each of the cross-correlations, a value of $V^{vert}$ at a row and column corresponding to the pair of images associated with the cross-correlation is equal to a sum of all of the weights of the at least one peak that was picked for the cross-correlation multiplied by a value of the second column of E' in a row that corresponds to the at least one peak that was picked for the cross-correlation;
   calculating matrices $Z^{horz}=V^{horz}-(V^{horz})^T$ and $Z^{vert}=V^{vert}-(V^{vert})^T$;
   calculating a 2-column matrix R, wherein the rows of R correspond with the images of the scene, wherein each of the values of R in a first of the columns of R is equal to a sum of all of the values of $Z^{horz}$ in a corresponding row thereof, and each of the values of R in a second of the columns of R is equal to a sum of all of the values of $Z^{vert}$ in a corresponding row thereof;
   solving for a 2-column matrix $D'=L^{-1}R$, where the values in a first of the columns of D' are estimates of the horizontal offsets of the images relative to the center of the images, and the values in a second of the columns of D' are estimates of the vertical offsets of the images relative to the center of the images;
   shifting each of the images horizontally and vertically according, respectively, to the first and second columns of D'; and
   adding the shifted images together to form the composite image.

\* \* \* \* \*